United States Patent
Liu et al.

(10) Patent No.: US 11,238,644 B2
(45) Date of Patent: Feb. 1, 2022

(54) IMAGE PROCESSING METHOD AND APPARATUS, STORAGE MEDIUM, AND COMPUTER DEVICE

(71) Applicant: TENCENT TECHNOLOGY (SHENZHEN) COMPANY LIMITED, Shenzhen (CN)

(72) Inventors: Tiancheng Liu, Shenzhen (CN); Hong Pan, Shenzhen (CN); Yuan Yu, Shenzhen (CN); Jinwen He, Shenzhen (CN); Liqiang Liu, Shenzhen (CN); Binru Zhao, Shenzhen (CN); Qinghua Zhong, Shenzhen (CN); Lvbo Wang, Shenzhen (CN); Huan Xiao, Shenzhen (CN); Chunan Fang, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/996,566

(22) Filed: Aug. 18, 2020

(65) Prior Publication Data
US 2020/0380769 A1    Dec. 3, 2020

Related U.S. Application Data

(63) Continuation of application No. PCT/CN2019/083295, filed on Apr. 18, 2019.

(30) Foreign Application Priority Data

May 22, 2018  (CN) .......................... 201810494117.8

(51) Int. Cl.
*G06T 15/20*    (2011.01)
*G06F 3/01*    (2006.01)
(Continued)

(52) U.S. Cl.
CPC ............ *G06T 15/205* (2013.01); *G06F 3/017* (2013.01); *G06T 19/003* (2013.01); *G06T 19/006* (2013.01); *G06T 2207/30241* (2013.01)

(58) Field of Classification Search
None
See application file for complete search history.

(56) References Cited

U.S. PATENT DOCUMENTS

2011/0320949 A1*  12/2011  Ohki ..................... G06F 40/177
                                                            715/727
2012/0249416 A1    10/2012  Maciocci et al.
(Continued)

FOREIGN PATENT DOCUMENTS

| CN | 107168619   |   | 9/2017 |
| CN | 107168619 A | * | 9/2017 |

(Continued)

OTHER PUBLICATIONS

Visualise, "AR Portal Demo App", Youtube @ https://www.youtube.com/watch?v=obA665RYXm4&t=58s (Year: 2018).*

(Continued)

*Primary Examiner* — Yingchun He
(74) *Attorney, Agent, or Firm* — Oblon, McClelland, Maier & Neustadt, L.L.P.

(57) ABSTRACT

This application relates to an image processing method and apparatus, a storage medium, and a computer device. The method can include obtaining image frames acquired from a real scene, and playing the obtained image frames one by one according to an acquisition time sequence. The method can further include determining a position corresponding to a target object in the real scene when a trajectory formed by a movement of the target object in a plurality of the obtained image frames meets a trigger condition, rendering a virtual entry in a currently played image frame according to the position, and displaying virtual content in the virtual entry.

(Continued)

The solutions provided in this application improve image processing efficiency.

20 Claims, 12 Drawing Sheets

(51) Int. Cl.
| | | |
|---|---|---|
| *G06T 19/00* | (2011.01) | |
| *G06F 3/03* | (2006.01) | |
| *G06F 3/0346* | (2013.01) | |
| *G06K 9/00* | (2006.01) | |
| *G06F 3/0481* | (2013.01) | |

(56) References Cited

U.S. PATENT DOCUMENTS

| | | | |
|---|---|---|---|
| 2013/0278504 A1* | 10/2013 | Tong | G06K 9/00355 345/158 |
| 2014/0063060 A1 | 3/2014 | Maciocci et al. | |
| 2017/0186219 A1* | 6/2017 | Xu | G06T 15/04 |
| 2017/0192753 A1* | 7/2017 | Karmon | G06F 8/33 |
| 2019/0102886 A1* | 4/2019 | Guigues | G06T 7/90 |
| 2019/0163266 A1* | 5/2019 | Johnson | G06F 3/017 |
| 2020/0226668 A1* | 7/2020 | Chiu | G06T 15/00 |
| 2021/0035346 A1* | 2/2021 | Chen | G06T 7/579 |

FOREIGN PATENT DOCUMENTS

| | | |
|---|---|---|
| JP | 2011-145856 A | 7/2011 |
| JP | 2014-515854 A | 7/2014 |
| JP | 2016-062486 A | 4/2016 |

OTHER PUBLICATIONS

European Search Report dated Jun. 11, 2021 in Application No. 19808017.8. (10 pages).
Nedd, "Augmented Reality Portal—ARKIT," YouTube, URL: <https://www.youtube.com/watch?v=371ZQW_Yzck>, Jun. 30, 2017 (1 page).
International Search Report dated Jul. 11, 2019 in International Application No. PCT/CN2019/083295. (5 pages).
Written Opinion dated Jul. 11, 2019 in International Application No. PCT/CN2019/083295. (3 pages).
Guosheng Lin, et al. "RefineNet: Multi-Path Refinement Networks for High-Resolution Semantic Segmentation", 2017 IEEE Conference on Computer Vision and Pattern Recognition, pp. 5168-5177.
Office Action dated Nov. 9, 2021, in corresponding Japanese Patent Application No. 2020-551294 with English translation, 12 pages.

* cited by examiner (a) (b)

(a) (b)

IMAGE PROCESSING METHOD AND APPARATUS, STORAGE MEDIUM, AND COMPUTER DEVICE

RELATED APPLICATION

This application is a continuation of International Application No. PCT/CN2019/083295, filed on Apr. 18, 2019, which claims priority to Chinese Patent Application No. 201810494117.8, entitled "IMAGE PROCESSING METHOD AND APPARATUS, STORAGE MEDIUM, AND COMPUTER DEVICE" and filed on May 22, 2018. The entire disclosures of the prior applications are hereby incorporated by reference in their entirety.

FIELD OF THE TECHNOLOGY

This application relates to the field of computer technologies, including an image processing method and apparatus, a storage medium, and a computer device.

BACKGROUND OF THE DISCLOSURE

With the development of computer technologies, image processing technologies can be increasingly improved. A user may process an image through professional image processing software to better present the processed image. The user may further add a material provided by the image processing software to the image through the image processing software, so that the processed image can convey more information.

However, in a related image processing manner, the user needs to open a material library of the image processing software, browse the material library, select a suitable material from the material library, adjust a position of the material in the image, to determine the modification, and complete image processing. Therefore, the related image processing manner needs a lot of manual operations, which is time-consuming, resulting in low efficiency of the image processing process.

SUMMARY

Exemplary embodiments of the disclosure can provide an image processing method and apparatus, a storage medium, and a computer device, that can resolve the inefficiencies of related image processing processes.

In an embodiment of the disclosure, an image processing method can include obtaining image frames acquired from a real scene, and playing the obtained image frames one by one according to an acquisition time sequence. Further, the method can include determining a position corresponding to a target object in the real scene in a case that a trajectory formed by a movement of the target object in a plurality of the obtained image frames meets a trigger condition, rendering a virtual entry in a currently played image frame according to the position, and displaying virtual content in the virtual entry.

Additionally, aspects of the disclosure can provide an image processing apparatus that can include an obtaining module that is configured to obtain image frames acquired from a real scene, and a playing module that is configured to play the obtained image frames one by one according to an acquisition time sequence. The apparatus can further include a determining module that is configured to determine a position corresponding to a target object in the real scene in a case that a trajectory formed by a movement of the target object in a plurality of the obtained image frames meets a trigger condition, and a rendering module that is configured to render a virtual entry in a currently played image frame according to the position, and display virtual content in the virtual entry.

Further embodiments can provide a non-transitory computer-readable storage medium that stores a computer program that, when executed by a processor, causes the processor to perform the following operations of obtaining image frames acquired from a real scene, and playing the obtained image frames one by one according to an acquisition time sequence. Additionally, the processor can perform the operations of determining a position corresponding to a target object in the real scene in a case that a trajectory formed by a movement of the target object in a plurality of the obtained image frames meets a trigger condition, rendering a virtual entry in a currently played image frame according to the position, and displaying virtual content in the virtual entry.

Exemplary embodiments can include a computer device having a memory and a processor. The memory can store a computer program that, when executed by the processor, causes the processor to perform the following operations of obtaining image frames acquired from a real scene, playing the obtained image frames one by one according to an acquisition time sequence, and determining a position corresponding to a target object in the real scene in a case that a trajectory formed by a movement of the target object in a plurality of the obtained image frames meets a trigger condition. The processor can further perform the operations of rendering a virtual entry in a currently played image frame according to the position, and displaying virtual content in the virtual entry.

In the foregoing image processing method and apparatus, storage medium, and computer device, on the one hand, the image frames reflecting the real scene are played, so that the played image frames can reflect the real scene. On the other hand, the position corresponding to the target object in the real scene is automatically determined when the trajectory formed by the movement of the target object in the image frame acquired from the real scene meets the trigger condition, to render the virtual entry in the currently played image frame according to the determined position and display the virtual content in the virtual entry. In this way, the virtual content of the virtual world can be automatically displayed in the virtual entry, and real content of the real world can be automatically displayed outside the virtual entry, thereby avoiding complicated steps of manual operations and greatly improving the image processing efficiency.

BRIEF DESCRIPTION OF THE DRAWINGS

Various embodiments of this disclosure that are proposed as examples will be described in detail with reference to the following figures, wherein like numerals reference like elements, and wherein.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used for describing this application, instead of limiting this application.

Figure 1:
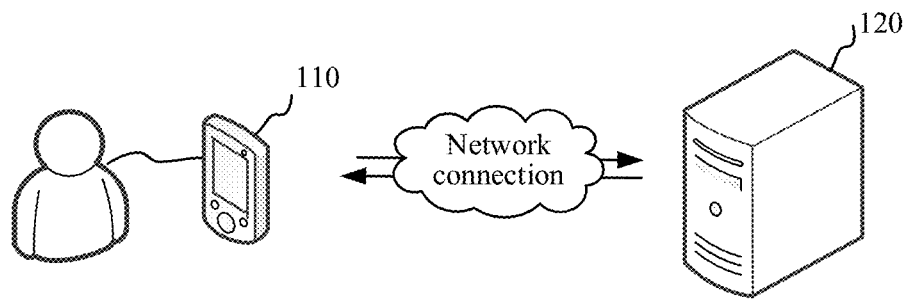
FIG. 1 is an application environment diagram of an image processing method according to an embodiment.

FIG. 1 is an application environment diagram of an image processing method according to an embodiment. Referring to FIG. 1, the image processing method is applied to an image processing system. The image processing system includes a terminal 110 and a server 120. The terminal 110 and the server 120 are connected via a network. The terminal 110 is configured to perform the image processing method. Exemplarily, the terminal 110 may be a desktop terminal or a mobile terminal. The mobile terminal may be at least one of a mobile phone, a tablet computer, a notebook computer, and the like. The server 120 may be an independent server or a server cluster formed by a plurality of independent servers.

The terminal 110 may obtain image frames acquired from a real scene, and play the obtained image frames one by one according to an acquisition time sequence. The image frame may be acquired by the terminal 110 from the real world through a built-in image acquisition apparatus or an externally connected image acquisition apparatus. The built-in image acquisition apparatus may be a front camera or a rear camera of the terminal 110. The image frame may be alternatively sent to the terminal 110 after being acquired from the real scene by another device. The terminal 110 may determine a position corresponding to a target object in the real scene when it is locally determined that a trajectory formed by a movement of the target object in a plurality of the obtained image frames meets a trigger condition. Further, the terminal 110 can render a virtual entry in a currently played image frame according to the position, and display virtual content in the virtual entry. The terminal 110 may alternatively send the obtained image frames to the server 120, when determining that a trajectory formed by a movement of the target object in a plurality of the obtained image frames meets a trigger condition. The server 120 can notify the terminal 110 that the trigger condition is met. Subsequently, the terminal 110 may determine a position corresponding to the target object in the real scene, render a virtual entry in a currently played image frame according to the position, and display virtual content in the virtual entry.

Figure 2:
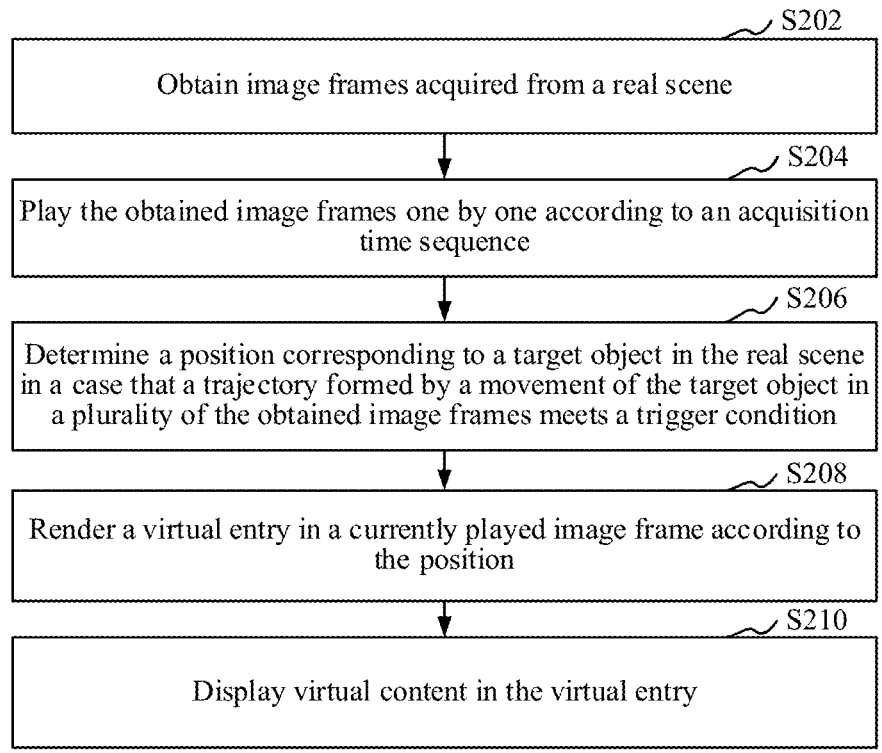
FIG. 2 is a schematic flowchart of an image processing method according to an embodiment.

FIG. 2 is a schematic flowchart of an image processing method according to an embodiment. In this embodiment, an example in which the image processing method is applied to a computer device is mainly used for description. The computer device may be the terminal 110 in FIG. 1. Referring to FIG. 2, the image processing method includes the following steps:

In step S202, the method can obtain image frames acquired from a real scene. The real scene is a scene existing in the natural world. The image frame is a unit in an image frame sequence that can form a dynamic picture and is used for recording a picture in the real scene at a certain moment. In an embodiment, the terminal may acquire the image frames from the real scene at a fixed or dynamic frame rate and obtain the acquired image frames. The fixed or dynamic frame rate enables the image frames to form a continuous dynamic picture when played at the fixed or dynamic frame rate. Further, the terminal may acquire image frames from the real scene through a built-in or externally connected image acquisition apparatus such as a camera in a current field of view of the camera, to obtain the acquired image frames. The field of view of the camera may change due to changes in a posture and a position of the terminal.

In an exemplary embodiment, the terminal may select an augmented reality (AR) photographing mode provided by an application running on a local machine to acquire image frames from the real scene, to obtain the acquired image frames. The application may be a social application. The social application is an application that can perform network social interaction based on a social network. The social application includes an instant messaging application, a social network service (SNS) application, a live streaming application, or a photographing application, such as QQ or WeChat.

In an embodiment, the terminal may receive image frames acquired from the real scene and sent by another terminal, to obtain the received image frames. For example, when establishing a video session through a social application running on the terminal, the terminal receives image frames acquired from the real scene and sent by a terminal corresponding to another session party. The frame rate at which the image frames are obtained may be the same as a frame rate at which the image frames are acquired or less than a frame rate at which the image frames are acquired.

In step S204, the method can play the obtained image frames one by one according to an acquisition time sequence. The acquisition time sequence refers to a time sequence in which the image frames are acquired, and may be represented through a relationship of timestamps of the image frames recorded during acquisition. Playing the frames one by one refers to playing the image frames frame by frame.

For example, the terminal may play the acquired image frames one by one in ascending order of the timestamps according to a frame rate at which the image frames are obtained. The terminal may play the obtained image frames directly, or store the obtained image frames in a buffer area according to the acquisition time sequence, and extract, according to the acquisition time sequence, the image frames from the buffer area for play. Further, the terminal may play, one by one in ascending order of the timestamps according to a frame rate at which the another terminal acquires the image frames, the received image frames sent by the another terminal and acquired from the real scene. The terminal may play the received image frames directly, or store the received image frames in a buffer area according to the acquisition time sequence, and extract, according to the acquisition time sequence, the image frames from the buffer area for play.

Figure 3:
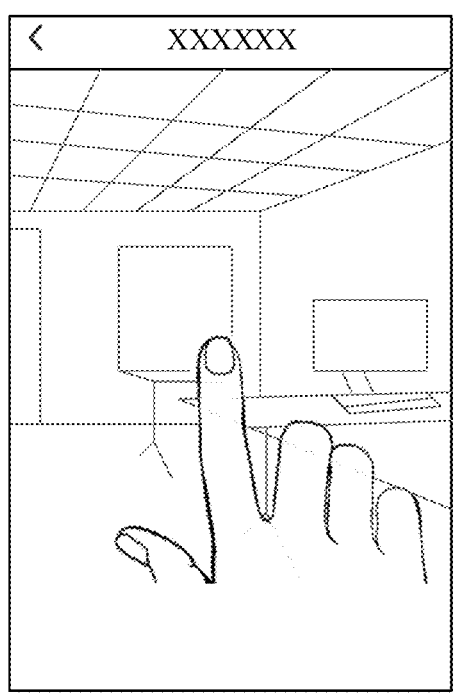
FIGS. 3(a) and (b) are schematic diagrams of an interface on which an image frame is played according to an embodiment.
Figure 3:
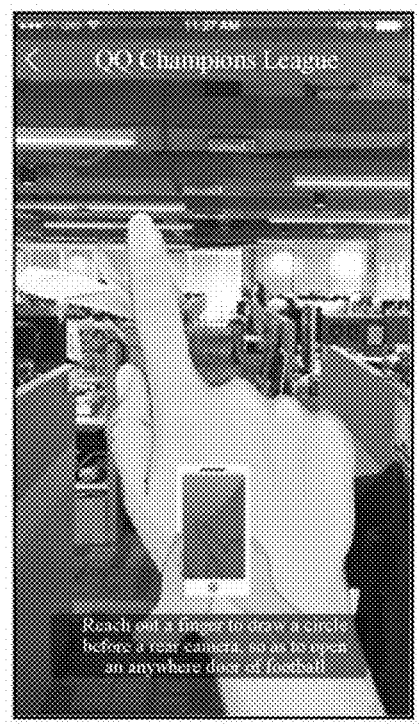

FIG. 3 shows a schematic diagram of an interface on which an image frame is played according to an embodiment. Referring to FIG. 3, FIG. 3(a) is a simplified schematic diagram of a terminal interface on which an image frame is played, and FIG. 3(b) is a screenshot of a recorded screen of the terminal interface on which the image frame is played. It can be seen that a picture in a real scene is displayed on a display screen of the terminal.

In step S206, the method can determine a position corresponding to a target object in the real scene in a case that a trajectory formed by a movement of the target object in a plurality of the obtained image frames meets a trigger condition. The target object is an entity as a target in the real scene. The target object may be a hand, a face, or an elongated object. The trajectory formed by the movement of the target object may be a trajectory formed by a movement of a reference point of the target object in the obtained image frame when the target object is moving. For example, a trajectory formed by a movement of an imaging point of an index fingertip of a hand in the obtained image frame when a user controls the hand to move. For another example, a trajectory formed by a movement of an imaging point on a top of an elongated object in the obtained image frame when the user holds the elongated object, such as a pen or a magic wand, to move.

The trigger condition is a constraint condition under which a specific event is triggered. In this embodiment, the specific event is an event in which a virtual entry is rendered in a played image frame. The trigger condition may be that the trajectory formed by the movement of the target object in the plurality of the obtained image frames is a regular closed shape, such as a triangle, a quadrangle, or a circle.

It may be understood that the user may select the target object, and control the target object to move in the real scene, so that the trajectory formed by the movement of the target object in the acquired image frame of the target object meets a specific constraint condition (such as the trigger condition) to trigger the specific event (rendering the virtual entry). A position corresponding to the target object in the real scene is a mapping of a position at which the user intends to render the virtual entry by using the terminal in the played image frame in the real scene. In this way, visual perception of the user is to trigger a virtual entry to appear in the real world, just like a real entry in the real world.

For example, when the trajectory formed by the movement of the target object in the plurality of the obtained image frames meets the trigger condition, the terminal determines a coordinate position of the target object in the image frames, and calculates a position of the target object in the real scene according to a projection matrix adapted to an image acquisition apparatus of the terminal. The coordinate position of the target object in the image frame may be specifically a coordinate position of a reference point of the target object in the image frames, for example, a coordinate position of an imaging point of an index fingertip of a hand. The coordinate position of the target object in the image frames may be alternatively a central coordinate position of a trajectory formed by the movement of the target object, for example, a central coordinate position of a trajectory of a circle when an index fingertip of a hand draws the circle.

In an exemplary application scenario, the user holds a terminal and opens a built-in camera on the terminal by using an application program for invoking the camera on the terminal, so that the terminal may acquire image frames from a real scene in a current field of view of the camera. That the user controls a target object to move toward the camera of the terminal is acquired, so as to obtain an image frame including the target object and acquired in real time. It may be understood that if the user opens a front camera, the acquired image frame includes the target object and a background of the front camera in the current field of view. If the user opens a rear camera, the acquired image frame includes the target object and a background of the rear camera in the current field of view.

In step S208, the method can render a virtual entry in a currently played image frame according to the position. The virtual entry is a concept relative to a real entry. The real entry is an entity used for dividing a real space in the real scene. The real entry, such as a room door, may divide the real space into an indoor area and an outdoor area. Alternatively, the real entry, such as an entry to a scenic spot, may divide the real space into a scenic spot and a non-scenic spot. The virtual entry is a virtual model used for dividing an area in a virtual scene. The virtual entry is, for example, a virtual model door.

It may be understood that a position in the real scene is an absolute position in the real space. The position does not change due to changes in a current field of view of a built-in or externally connected image acquisition apparatus of the terminal. It can be seen that, when the current field of view of the image acquisition apparatus changes, rendering positions and sizes of the virtual entry in the image frames are different. Therefore, when the current field of view of the image acquisition apparatus changes, the rendering positions and sizes of the virtual entry in the image frames present a foreshortening effect based on an object imaging principle in the real world. For example, the terminal may calculate, after determining the position of the target object in the real scene, a rendering position of the virtual entry in the image frame acquired in the current field of view according to the real scene and a projection matrix adapted to the image acquisition apparatus of the terminal in the current field of view, and render the virtual entry at the position.

Figure 4:
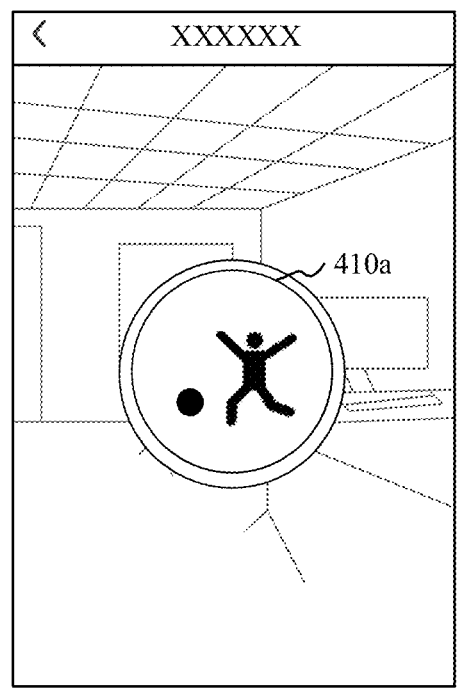
FIGS. 4(a) and (b) are schematic diagrams of an interface on which a virtual entry is rendered in a currently played image frame according to an embodiment.
Figure 4:
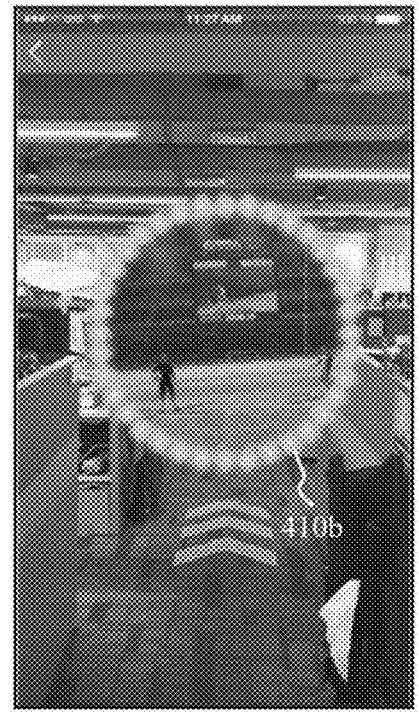

FIG. 4 shows a schematic diagram of an interface on which a virtual entry is rendered in a currently played image frame according to an embodiment. Referring to FIG. 4, FIG. 4(a) is a simplified schematic diagram of a terminal interface on which a virtual entry is rendered in a currently played image frame, and FIG. 4(b) is a screenshot of a recorded screen of the terminal interface on which the virtual entry is rendered in the currently played image frame. FIG. 4(a) includes a rendered virtual entry 410a, and FIG. 4(b) includes a rendered virtual entry 410b.

In step S210 the method can display virtual content in the virtual entry. The virtual content herein is content that does not exist in a real scene from which the obtained image frame is acquired. If the obtained image frame is acquired from a real scene A, the virtual content is content that does not exist in the real scene A. It may be understood that the virtual content herein is virtual content relative to a current real scene, but not absolute virtual content. In other words, the virtual content herein may be completely virtual content simulated through computer technologies, or content in a non-current real scene. The current real scene is a real scene from which the image frame obtained by the terminal is acquired.

In an embodiment, the virtual content may be dynamic content or static content. The virtual content may be unified content, content corresponding to a trajectory formed by a movement of a target object in the image frame, or content selected by the user independently. Exemplarily, the terminal may set a correspondence between the trajectory and the virtual content, so that the terminal may query, after recognizing the trajectory, the virtual content corresponding to the trajectory for display. For example, when the trajectory is a triangle, the displayed virtual content is a football game video; when the trajectory is a quadrangle, the displayed virtual content is a video of a captured shopping mall; and when the trajectory is a circle, the displayed virtual content is a video of a captured scenic spot. The terminal may further display a selection dialog box, displayed available virtual content in the selection dialog box, and then display virtual content selected by a user selection instruction in the virtual entry.

In an embodiment, the virtual content may be a virtual video or a video generated by acquiring image frames from a real scene. For example, if the user holds the terminal at an office to acquire a real scene at the office to obtain image frames for play, content displayed outside the virtual entry is the real scene of the office, content displayed inside the virtual entry may be a game video, or a real scene acquired by another image acquisition apparatus in a place other than the current office, such as Wangfujing Street.

Still referring to FIG. 4, it can be seen that the virtual content is displayed inside the virtual entry 410a/b, and a picture in the real scene is displayed outside the virtual entry 410a/b. In this way, visual perception of the user is that a virtual world is displayed inside the virtual entry, and a real world is displayed outside the virtual entry. The user may view the virtual world inside the virtual entry by moving to pass through the virtual entry, or view the real world outside the virtual entry by moving to go out of the virtual entry, so as to experience a passing-through effect between the virtual world and the real world.

In the foregoing image processing method, on the one hand, the image frames reflecting the real scene are played, so that the played image frames can reflect the real scene. On the other hand, the position corresponding to the target object in the real scene is automatically determined when the trajectory formed by the movement of the target object in the image frame acquired from the real scene meets the trigger condition, to render the virtual entry in the currently played image frame according to the determined position and display the virtual content in the virtual entry. In this way, the virtual content of the virtual world can be automatically displayed in the virtual entry, and real content of the real world can be automatically displayed outside the virtual entry, thereby avoiding complicated steps of manual operations and greatly improving the image processing efficiency.

In an embodiment, the target object is a hand. The image processing method can further include segmenting a hand image from the obtained image frame, recognizing a gesture type corresponding to the hand image, determining a movement reference point in the image frame when the gesture type is a trigger type, and determining, according to the movement reference point, a trajectory formed by a movement of the hand.

The hand is a body part of a person or an animal. The hand image is an image including the hand and having a hand area accounting for a large proportion of the image area. The gesture is an action form made by the user through the hand. The gesture type is a type of the gesture in the obtained image frame. The trigger type is a type of the gesture that triggers a specific event.

The movement reference point is a reference standard used for discriminating a movement process of the target object. It may be understood that changes in the position of the movement reference point in different image frames indicate that the target object moves. For example, an imaging point of an index fingertip is used as the movement reference point, and when a position of the imaging point of the index fingertip in the plurality of image frames changes, it is determined that the hand moves.

It may be understood that compared to directly recognizing the gesture type of a hand area in an obtained original image frame, segmenting the hand image from the obtained image frame and then recognizing the gesture type of the segmented hand image may avoid an inaccurate recognition problem caused when the hand image accounts for a small proportion of the entire image frame, so that the interference on the recognition of the gesture type of the hand area in the original image frame relative to the background area of the hand area can be reduced, and the recognition accuracy can be improved.

In an embodiment, the segmenting a hand image from the obtained image frame can include encoding the obtained image frame into a semantic segmentation feature matrix through a hand recognition model, decoding the semantic segmentation feature matrix to obtain a semantically segmented image, a pixel point in the semantically segmented image having a pixel value that represents a classification category to which the pixel point belongs and corresponding to a pixel point in the encoded image frame, and segmenting the hand image from the image according to a pixel point belonging to a hand category.

The hand recognition model is a machine learning model trained with a hand recognition capability. A full English name of machine learning is called ML for short. The machine learning model may have a specific capability through sample learning. The machine learning model may include a neural network model, a support vector machine, a logistic regression model, or the like. The neural network model is, for example, a convolutional neural network. In this embodiment, the hand recognition model may be a fully convolutional network model.

The semantic segmentation feature matrix is a low-dimensional expression of a semantic feature of image content in the image frame and covers semantic feature information of the entire image frame. The semantically segmented image is an image segmented into several non-overlapping areas with certain meanings. A pixel value of a pixel point in the semantically segmented image is used for reflecting a classification category to which the corresponding pixel point belongs. The classification of the pixel points may be two-classification or multi-classification. The two-classification of the pixel points is, for example, a pixel point corresponding to a road in a map image and other pixel points. The multi-classification of the pixel points is, for example, a pixel point corresponding to sky in a scenery map, a pixel point corresponding to a ground, and a pixel point corresponding to a person, and the like. An image size of the semantically segmented image is the same as an image size of the original image frame. In this way, it may be understood that a model input image is classified pixel point by pixel point. Categories to which all pixel points in the model input image belong may be obtained according to pixel values of the pixel points in the semantically segmented image.

Exemplarily, the terminal may obtain a hand recognition model through training by using image samples of each gesture type. In this way, the terminal uses the hand image as an input of the hand recognition model after segmenting the hand image from the obtained image frame, and encodes the hand image into a semantic segmentation feature matrix through an encoding structure of the obtained hand recognition model. Then, the terminal continues to decode the semantic segmentation feature matrix through a decoding structure of the hand recognition model to obtain the semantically segmented image.

When there is a unique gesture type for a trigger type that is set by the terminal, the hand recognition model is a two-classification model. Image samples used for training the two-classification model include a positive sample belonging to a target gesture type and a negative sample not belonging to the target gesture type. When there are a plurality of gesture types for the trigger type that are set by the terminal, the hand recognition model is a multi-classification model. Image samples used for training the multi-classification model include samples belonging to all target gesture types.

Figure 5:
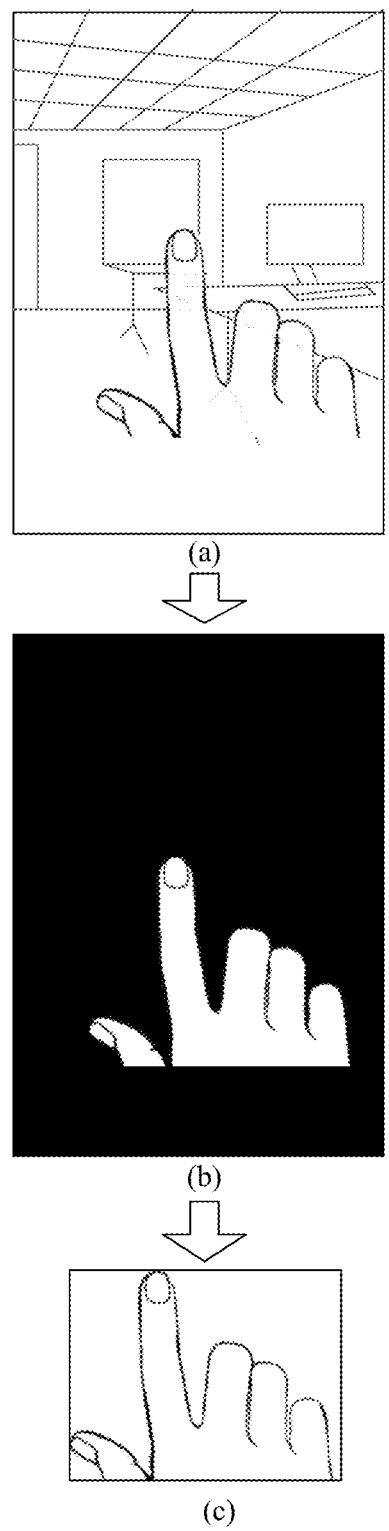
FIGS. 5 (a)-(c) are a schematic diagrams of a hand area segmented from an obtained image frame according to an embodiment.

FIG. 5 shows a schematic diagram of a hand area segmented from an obtained image frame according to an embodiment. Referring to FIG. 5, FIG. 5(a) is an obtained original image frame including the hand area; FIG. 5(b) is a semantically segmented image obtained after semantic segmentation; and FIG. 5(c) is a regular hand image of the segmented hand area.

In this embodiment, after the image frame is obtained, the image frame is automatically inputted into the trained machine learning model, the image frame is encoded into a semantic segmentation feature matrix, and then the semantic segmentation feature matrix is decoded to obtain the semantically segmented image. A pixel point in the semantically segmented image has a pixel value that represents a classification category to which the pixel point belongs, and corresponds to a pixel point in the original image frame. In this way, a hand area is automatically determined according to a pixel point belonging to a hand category to segment a hand image, thereby improving the image segmentation accuracy.

Further, the terminal may compare the segmented hand image to a hand image template of a trigger type, determine, when the segmented hand image matches the hand image template of the trigger type, that the gesture type corresponding to the hand image is the trigger type, and then determine a movement reference point in the image frame, and determine, according to the movement reference point, a trajectory formed by a movement of the hand.

The terminal may alternatively input the segmented hand image into a trained gesture recognition model to obtain a gesture recognition result outputted by the gesture recognition model, and then determine a movement reference point in the image frame when the gesture recognition result indicates that a gesture type corresponding to the hand image is a trigger type, and determine, according to the movement reference point, a trajectory formed by a movement of the hand.

In an exemplary scenario, a user makes a gesture toward a camera of the terminal, and determines a movement reference point of the gesture in each continuous frame of the acquired image when determining an operation type corresponding to the gesture is a drawing type. Due to a high frequency at which the image is acquired, continuous movement reference points may be connected by an extremely short line to form a trajectory.

In an embodiment, the terminal may select an image frame from the obtained image frames according to an acquisition time sequence at a frame rate less than an obtained frame rate to segment the hand image and recognize the gesture. The selecting an image frame from the obtained image frames may be asynchronously selecting the image frame through multi-threading to independently segment the hand image and recognize the gesture, so that the recognition efficiency can be improved.

In the foregoing embodiment, a specific gesture is made by using the hand to draw a specific trajectory across the air, so that a display effect of a virtual entry may be automatically triggered. The user does not need to perform an operation in the entire drawing process through an input apparatus, and the user may perform drawing by using a shown gesture in a relatively large space range, thereby improving the convenience for triggering the virtual entry.

In an embodiment, the image processing method further can include replacing, in a played video frame, pixel values of pixel points through which the trajectory passes with reference pixel values when the trigger condition is not met, and playing a reference animation in the currently played image frame according to the position when the trigger condition is met.

Exemplarily, when the trigger condition is not met, in order to visually highlight the trajectory formed by the movement of the target object and help the use intuitively perceive whether the trigger condition is met, the trajectory may be displayed by using pixel values different from those of the pixel points in the image. The trajectory is essentially a trajectory formed by pixel coordinates corresponding to movement reference points in a plurality of continuous image frames. Therefore, the terminal may determine the pixel points through which the trajectory passes in the image frame according to the pixel coordinates, and update the pixel values of the pixel points as the reference pixel values. The reference pixel value is, for example, a pixel value corresponding to relatively bright green or red.

In an embodiment, the terminal may alternatively update the pixel values of the pixel points within a certain range centered on the pixel points, as the reference pixel values. The terminal may alternatively render a particle animation at the pixel points through which the trajectory passes, and cover or replace the pixel values of the pixel points through which the trajectory passes to achieve an effect of a magic gesture movement.

In an embodiment, the terminal may update the pixel values or render the particle animation in real time, and update the pixel values of the pixel points once determining the pixel points through which the trajectory passes in the current image frame, or render the particle animation at the position of the pixel points, so that a movement trajectory can be displayed in real time.

Figure 6:
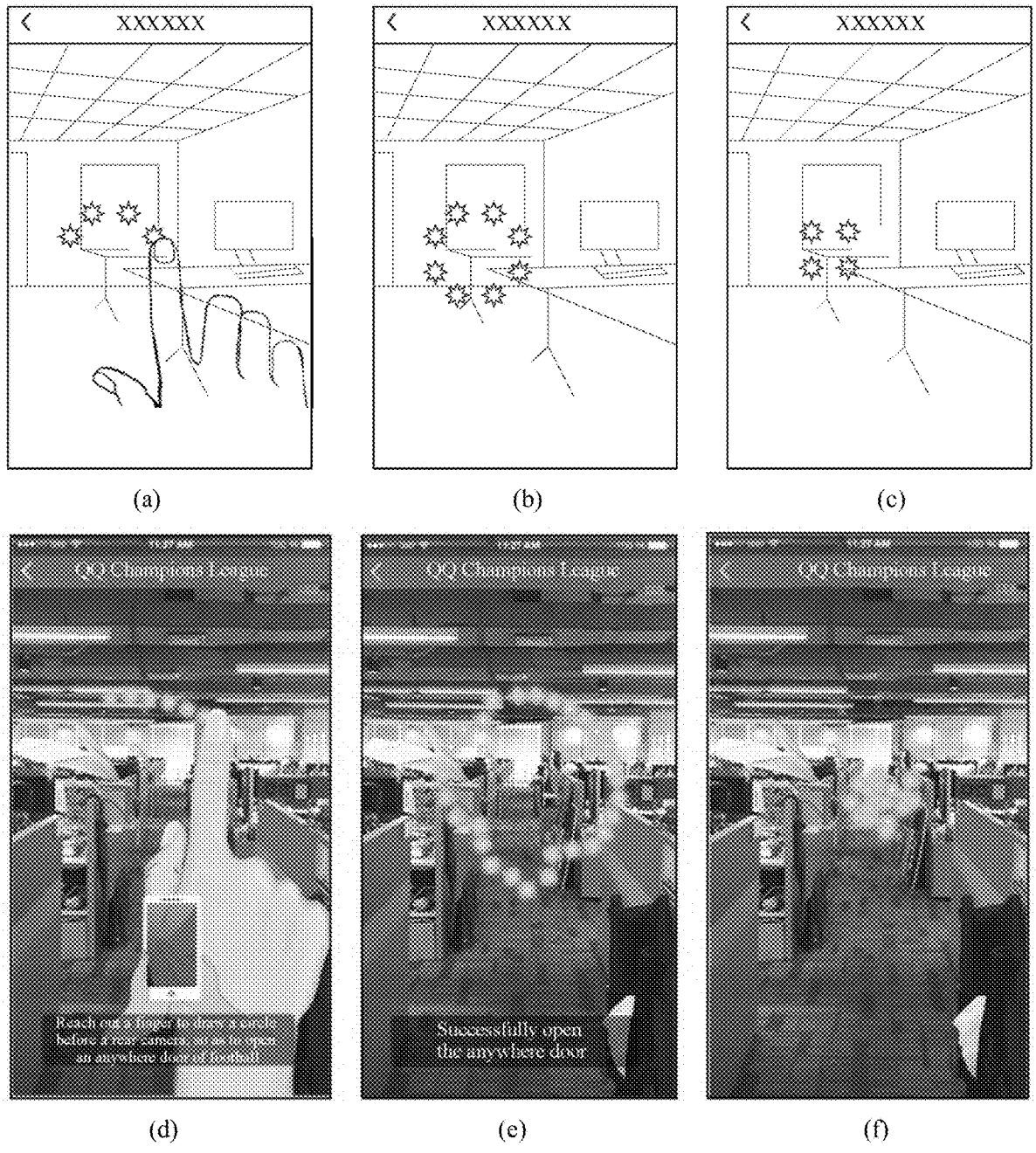
FIGS. 6 (a)-(f) show schematic diagrams of trajectory changes in image frames according to an embodiment.

FIG. 6 shows a schematic diagram of trajectory changes in an image frame according to an embodiment. Referring to FIG. 6, FIG. 6 (a), FIG. 6 (b), and FIG. 6 (c) are simplified schematic diagrams of a terminal interface when a trajectory changes in the image frame, and FIG. 6 (d), FIG. 6(e) and FIG. 6(f) are screenshots of recorded screens of the terminal interface when the trajectory changes in the image frame. It can be clearly seen from FIG. 6(a) or FIG. 6(d) that pixel values of pixel points through which the trajectory passes are updated to be different from original pixel values. It can be clearly seen from FIG. 6(b) or FIG. 6(e) that the trajectory formed by a movement of a target object in a plurality of the obtained image frames is a circle, which meets a trigger condition. It can be clearly seen from FIG. 6(c) or FIG. 6(f) that pixel points with values different from the original pixel values gradually approach the center of the trajectory to achieve an animation effect.

Further, when the trigger condition is met, the terminal may play a reference animation in a currently played image frame according to a position corresponding to the target object. In the reference animation, the pixel points updated as the reference pixel values are gradually restored to the original pixel values, or rendering of the particle animation is gradually cancelled, or the rendering is cancelled after the particle animation gradually approaches the center of the trajectory.

In the foregoing embodiment, by updating the pixel values of the pixel points through which the trajectory passes in the image frame, a movement trajectory of the target object may be directly displayed in a current image frame to achieve a real-time drawing effect and improve user perception. In addition, after the trigger condition is met, the reference animation is played, which is more interesting.

In an embodiment, the determining a position corresponding to a target object in the real scene can include determining a world coordinate position of the target object in a world coordinate space. The rendering a virtual entry in a currently played image frame according to the position corresponding to the target object can include rendering the virtual entry in the currently played image frame according to a camera coordinate position corresponding to the world coordinate position in a camera coordinate space. The world coordinate position is a coordinate position of the target object in the world coordinate space.

The world coordinate space is a coordinate space of the real scene and is a fixed absolute coordinate space. The camera coordinate space is a coordinate space formed by using an intersection of an optical axis and an image plane as an origin, and is a relative coordinate space that changes with a position change of an image acquisition apparatus (a camera). The world coordinate position in the world coordinate space may be mapped as a camera coordinate position in a camera coordinate system through a rigid-body change.

It may be understood that for a target object in the real scene, generally, when the target object does not move, a world coordinate position of the target object in the world coordinate space is fixed, but as the position and a posture of the image acquisition apparatus change, a camera coordinate position of the target object in the camera coordinate space is relatively unchanged.

In this application, the virtual entry is intended to be rendered, in the image frame, at a position at which the world coordinate position of a movement of the target object is mapped, so that the user perceives that the virtual entry exists at the world coordinate position of the movement of the target object. Therefore, the world coordinate position of the movement of the target object needs to be obtained, and then the camera coordinate position in the current camera coordinate space is determined in real time. For example, the user holds a terminal to draw a circle with the index fingertip of the hand in a field of view of a rear camera. In other words, a virtual door, that is, a virtual entry, appears at a position at which the circle is drawn by the finger in the real scene.

Exemplarily, when determining that the trajectory formed by the movement of the target object in a plurality of the obtained image frames meets the trigger condition, the terminal may obtain an image coordinate position of the target object in the current image frame, obtain the camera coordinate position of the target object according to a projection change of the image coordinate space and the camera coordinate space, and then obtain a world coordinate position of the target object in the world coordinate space according to a rigid-body change of the camera coordinate space and the world coordinate space. The image coordinate space is a coordinate space using the center of the image as an origin and formed by sides whose coordinate axes are parallel to the image.

It may be understood that because a projection change relationship between the camera coordinate space and the image coordinate space is determined based on factory settings, horizontal and vertical coordinates of the target object in the camera coordinate space may be determined according to the projection change relationship and the image coordinate position in the image coordinate space, and then coordinates of the target object in a vertical direction in the camera coordinate space may be obtained according to an image depth of the target object.

Figure 7:
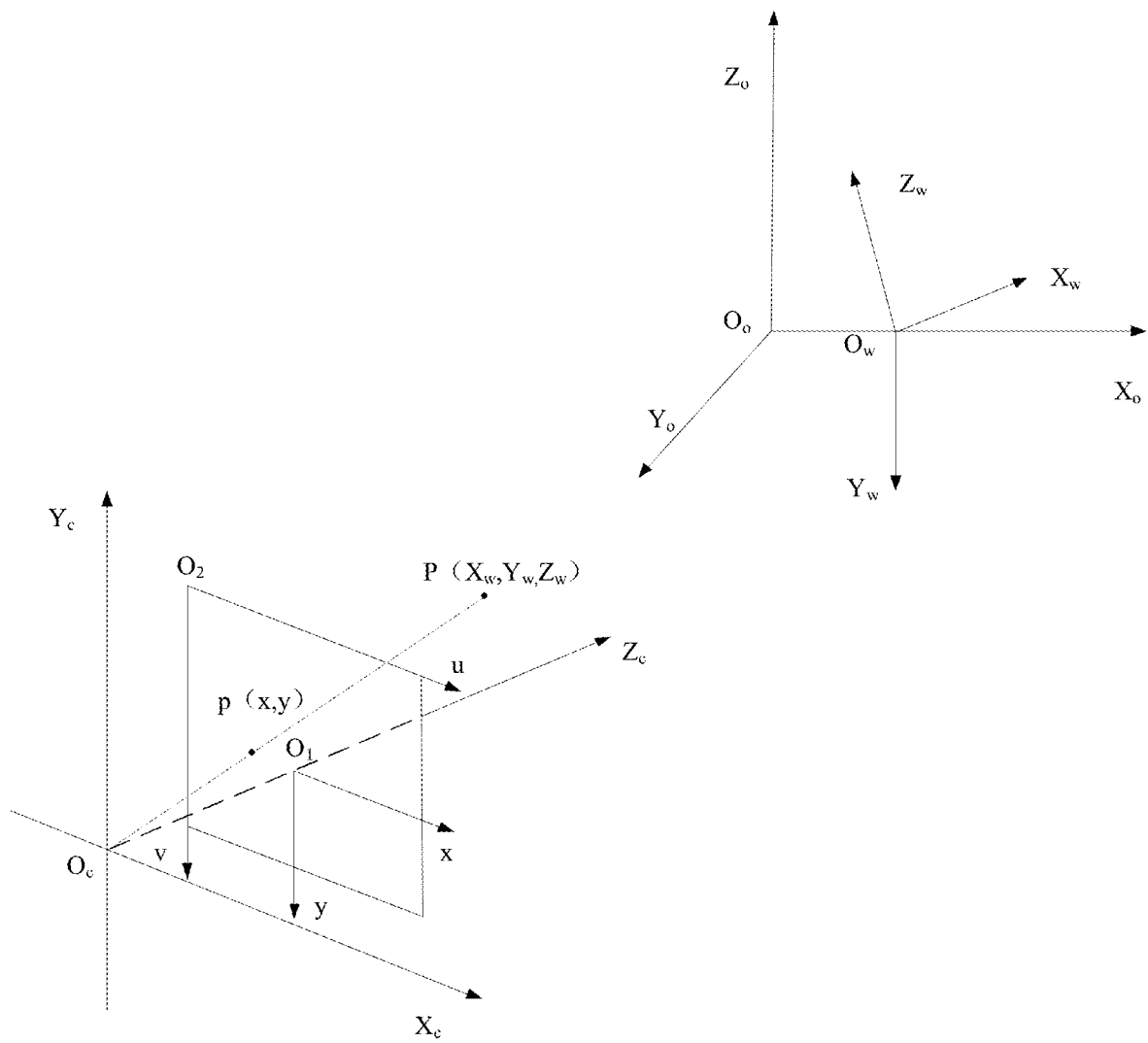
FIG. 7 is a schematic diagram of a relationship between coordinate spaces according to an embodiment.

Because a plurality of coordinate spaces are involved in the embodiments of this application, in order to make the solutions of this application clearer, for example, FIG. 7 is used as an example to differentiate and explain the coordinate spaces. Referring to FIG. 7, $O_o\text{-}X_oY_oZ_o$ is a coordinate system of a model coordinate space, $O_w\text{-}X_wY_wZ_w$ is a coordinate system of a world coordinate space, $O_c\text{-}X_cY_cZ_c$ is a coordinate system of a camera coordinate space, $O_1\text{-}xy$ is a coordinate system of an image coordinate space, and $O_2\text{-}uv$ is a coordinate system of a pixel coordinate space. A point P $(X_w, Y_w, Z_w)$ is a point in the world coordinate space, for example, a real point in the real world, and a point p is an image point in the image frame matching the point P $(X_w, Y_w, Z_w)$. Position coordinates of the point p in the image coordinate system space is (x, y), and the position coordinates in the pixel coordinate system space is (u, v). A camera coordinate position of the point p in the camera coordinate space may be determined through the position coordinates (x, y) of the point p in the image coordinate space and a depth of the point p. It may be understood an origin of the pixel coordinate space is a screen vertex.

In an embodiment, the rendering the virtual entry in the currently played image frame according to a camera coordinate position corresponding to the world coordinate position in a camera coordinate space includes: obtaining a position and a posture of a current terminal, determining a transformation matrix between the current camera coordinate space and the world coordinate space according to the position and the posture of the current terminal, transforming the world coordinate position into the camera coordinate position in the camera coordinate space according to the transformation matrix, and rendering the virtual entry in the currently played image frame according to the camera coordinate position.

The position of the current terminal is a position of an image acquisition apparatus of the current terminal in the real scene. The posture of the current terminal includes spatial states of roll, pitch, and yaw of the image acquisition apparatus of the current terminal in the real scene.

It may be understood that the terminal further performs a step of constructing a map before performing image processing. The terminal acquires a key frame to locate and record a position in the real scene when acquiring the key frame. In this way, the terminal may match a currently obtained image frame with the key frame when performing image processing in real time, to correspond to a position at which the matched key frame is recorded. The terminal may construct a corresponding map for the real scene based on simultaneous localization and mapping (SLAM), visual odometry (VO), or visual inertial odometry (VIO).

In an embodiment, the obtaining a position and a posture of a current terminal includes: selecting a map node matching the obtained image frame from a map; querying for a stored position that is in the real scene and that corresponds to the map node; obtaining sensor data acquired by an inertial sensor; and determining the gesture of the current terminal according to the sensor data.

Exemplarily, the terminal may match the obtained image frame with a node image in the map, locate a map node of the matched node image when the matching is successful, and query for a stored position corresponding to the map node in the real scene, that is, a current position of the terminal. The terminal may further obtain the sensor data acquired by the inertial sensor (inertial measurement unit, IMU), and determine the posture of the current terminal based on the sensor data. In this way, a rigid-body transformation matrix between the current camera coordinate space and the world coordinate space may be calculated according to the position and the posture of the current terminal.

It may be understood that when constructing the map, the terminal may calculate the rigid-body transformation matrix between the camera coordinate space and the world coordinate space at a reference map node. In this way, by using the rigid-body transformation matrix between the camera coordinate space and the world coordinate space at another map node position, the rigid-body transformation matrix between the current camera coordinate space and the world coordinate space may be obtained according to changes in the position and the posture of the current map node and the reference map node. The terminal may alternatively determine the current rigid-body transformation matrix between the world coordinate space and the current camera coordinate space according to a conversion relationship between a world coordinate position of an object point and a camera coordinate position of an image point in the current camera coordinate space in real time.

In this embodiment, the current terminal is located in combination with an image feature of a currently acquired image frame and sensor data acquired by an inertial sensor, thereby improving the location accuracy. Further, the terminal may transform the world coordinate position into the camera coordinate position in the camera coordinate space according to the current rigid-body transformation matrix between the world coordinate space and the current camera coordinate space.

In an embodiment, the rendering the virtual entry in the currently played image frame according to the camera coordinate position includes: projecting model vertexes of the virtual entry into corresponding pixel points in an image coordinate space; combining the corresponding pixel points of the model vertexes into image elements according to a connection relationship between the model vertexes; and rendering rasterized image elements according to pixel values of the pixel points in the image elements at an image coordinate position corresponding to the camera coordinate position in the image coordinate space, to obtain the virtual entry.

A model of the virtual entry is a set model. A model parameter is also set. The model parameter includes a connection relationship between a model vertex parameter and a model vertex. The model vertex parameter includes a model coordinate position of the model vertex in a model coordinate space, a color of the model vertex, and a model texture coordinate. The image element is a basic graphic such as a point, a line, or a surface. Rasterization is a process of converting the image elements into a set of two-dimensional images. The two-dimensional images represent pixels that may be drawn on a screen. Generally, the image elements are assembled to obtain a graphic including vertexes, and the rasterization is to obtain, through interpolation, pixels of an area of the graphic based on the shape of the graphic.

For example, the terminal may project the model vertexes of the virtual entry into corresponding pixel points in the image coordinate space through a transformation relationship from the model coordinate space, the world coordinate space, and the camera coordinate space, to the image coordinate space. Then, the corresponding pixel points of the model vertexes are combined into image elements according to a connection relationship between the model vertexes to achieve assembly of the image elements. Then, the image elements are rasterized and colorized, and rendering is performed at an image coordinate position corresponding to a camera coordinate position in the image coordinate space to obtain the virtual entry. The terminal may draw a virtual model according to an open graphics library (OpenGL).

The terminal may perform rendering at the image coordinate position corresponding to the camera coordinate position in the image coordinate space in the acquired image frame to obtain the virtual entry, and then place the image frame having the obtained rendered virtual entry in a buffer area for display; or may directly display the image frame having the obtained rendered virtual entry on a terminal screen.

In an embodiment, the image processing method further includes a step of constructing a map. The step of constructing a map can include selecting an image frame from the image frames acquired according to the time sequence, obtaining the selected image frame as a node image in a case that an image feature of the selected image frame conforms to an image feature of the node image, determining a corresponding map node of the obtained node image in the map, and storing the image feature of the obtained node image corresponding to the determined map node and a position at which the obtained node image is acquired in the real scene.

The selected image frame may be a key frame in the acquired image frames. In an embodiment, the terminal may receive a user selection instruction, and select an image frame from the acquired image frames according to the user selection instruction. The terminal may alternatively select an image frame from the acquired image frames according to a quantity of spaced frames. For example, one image frame is selected every other 20 image frames.

The image feature of anode image is an image feature used for selecting the node image. The image feature conforming to the node image may be that a quantity of matched feature points in feature points included in an image and feature points included in the existing node image exceeds a reference quantity, or may be that a proportion of matched feature points in feature points included in an image and feature points included in the existing node image to the feature points included in the existing node image is less than a reference proportion.

For example, it is assumed that a quantity of feature points included in a recently added node image is 100, and a quantity of feature points included in a currently selected image frame is 120, a reference quantity is 50, and a reference proportion is 90%. If a quantity of matched feature points in the feature points included in the currently selected image frame and the feature points included in the recently added node image is 70, the quantity of the matched feature points included in the current image frame and included in the existing node image is greater than the reference quantity, it may be determined that the feature of the currently selected image frame conforms to the feature of the node image.

In an embodiment, after obtaining an instruction for constructing a map, the terminal may acquire image frames at a fixed or dynamic frame rate, select an image frame in which a quantity of feature points included in the acquired image frame is greater than a quantity threshold as an initial node image, and determine a corresponding map node of the node image in the map and corresponding positions of the feature points included in the node image in the map, to construct a local map. Then, the terminal selects an image frame from the image frames acquired according to a time sequence, and selects the image frame conforming to the feature of the node image as a subsequent node image until a global map is obtained.

In an example, the terminal may track a feature point in a reference node image by using the initial node image as the reference node image. When a quantity of matched feature points included in the selected image frame and included in the reference node image is less than a first quantity and greater than a second quantity, the selected image frame is used as the node image. When the quantity of the matched feature points included in the selected image frame and included in the reference node image is less than the second quantity, a recently obtained node image is used as the reference node image, and the image continues to be tracked to select the node image.

Further, the terminal may determine to acquire, in a natural space, a map node of the obtained node image projected in a map space. The terminal may extract a feature of a node image ranking top in a time sequence of the obtained node images, calculate a change matrix between the node image ranking top in the time sequence and the obtained node image, and obtain, according to the change matrix, obtain a change amount from a position when the node image ranking top in the time sequence is acquired to a position when the obtained node image is acquired, and determine, according to the change amount, a corresponding map node of the obtained node image in the map.

The change matrix is a similar change relationship between a feature of one two-dimensional image and a feature of the other two-dimensional image. Exemplarily, the terminal may extract an image feature of the obtained node image, match the image feature with an image feature of a node image corresponding to an existing node in the map, and obtain positions of a successfully matched image feature in the obtained node image and the existing node image, respectively. The obtained node image is an image frame acquired later, and the existing node image is an image frame acquired earlier. The terminal may determine a change matrix between the image frame acquired later and the image frame acquired earlier according to the positions of the obtained matched image features on the image frame acquired later and the image frame acquired earlier, so as to obtain a position change and a posture change when the terminal acquires the two image frames, and then obtain a position and a posture of an image acquired later according to a position and a posture of a currently acquired image.

In an embodiment, a node image corresponding to the existing node in the map may have one frame or a plurality of frames. The terminal may further compare the feature of the obtained node image to features of node images corresponding to a plurality of existing nodes to obtain change matrices between the image frame acquired later and the plurality of image frames acquired earlier, and obtain a position and a gesture of an image acquired later according to the plurality of change matrices. For example, a plurality of position change amounts and posture change amounts obtained through calculation are weighted and averaged.

In this embodiment, a conversion relationship between the currently obtained node image and a previously existing node image is obtained through the change matrix between the features of the node images, so that a position of a current image frame in the map may be inferred by the position of the previous image frame in the map.

For example, the terminal may extract an image feature of a node image, store the image feature of the node image corresponding to a map node of the node image, and may directly search for the image feature of the corresponding node image according to the map node when comparison of image features is needed, to save a storage space and improve the search efficiency. The terminal may further store a position at which the obtained node image is acquired in a real scene to search for, during terminal location according to the map node, a position at which a corresponding node image is stored, to improve the search efficiency.

In this embodiment, the map may be automatically constructed by acquiring the image frame and processing of the acquired image frame, thereby avoiding artificial surveying and mapping of the environment by a large quantity of staff members having professional drawing capabilities, and high requirements and a large amount of labor on the staff members, and improving the map construction efficiency.

In an embodiment, virtual content is a panoramic video. The image processing method further includes: determining a space area that is of the virtual entry and that corresponds to the real scene; and directly displaying a video picture in a current field of view in the panoramic video after a position of a current terminal passes through the space area.

The panoramic video is a video captured in a 360-degree view by using a 3D camera. When viewing the panoramic video, a user may perform 360-degree panoramic viewing by freely adjusting the angle of view. The space area that is of the virtual entry and that corresponds to the real scene is a projection, in the world coordinate space, of a space occupied by the virtual entry in a camera coordinate space. The space area may be a planar space area having no thickness; or a three-dimensional space area having a thickness. For the user, the user perceives that a virtual entry (virtual room door) appears at a fixed position in the real scene. When holding the terminal and moving to the position, the user perceives that the user is walking toward the virtual entry (virtual room door).

Exemplarily, after the current position of the terminal passes through the space area, it may be understood that the user enters another room or space through the room door. The terminal may establish a three-dimensional spherical model with the current position of the terminal as the center of the sphere, and render the panoramic video to the inside of a spherical surface in a texture manner. In this way, the terminal may directly display a video picture in the panoramic video in a current field of view of the terminal. The current field of view is related to a current posture of the terminal.

Figure 8:
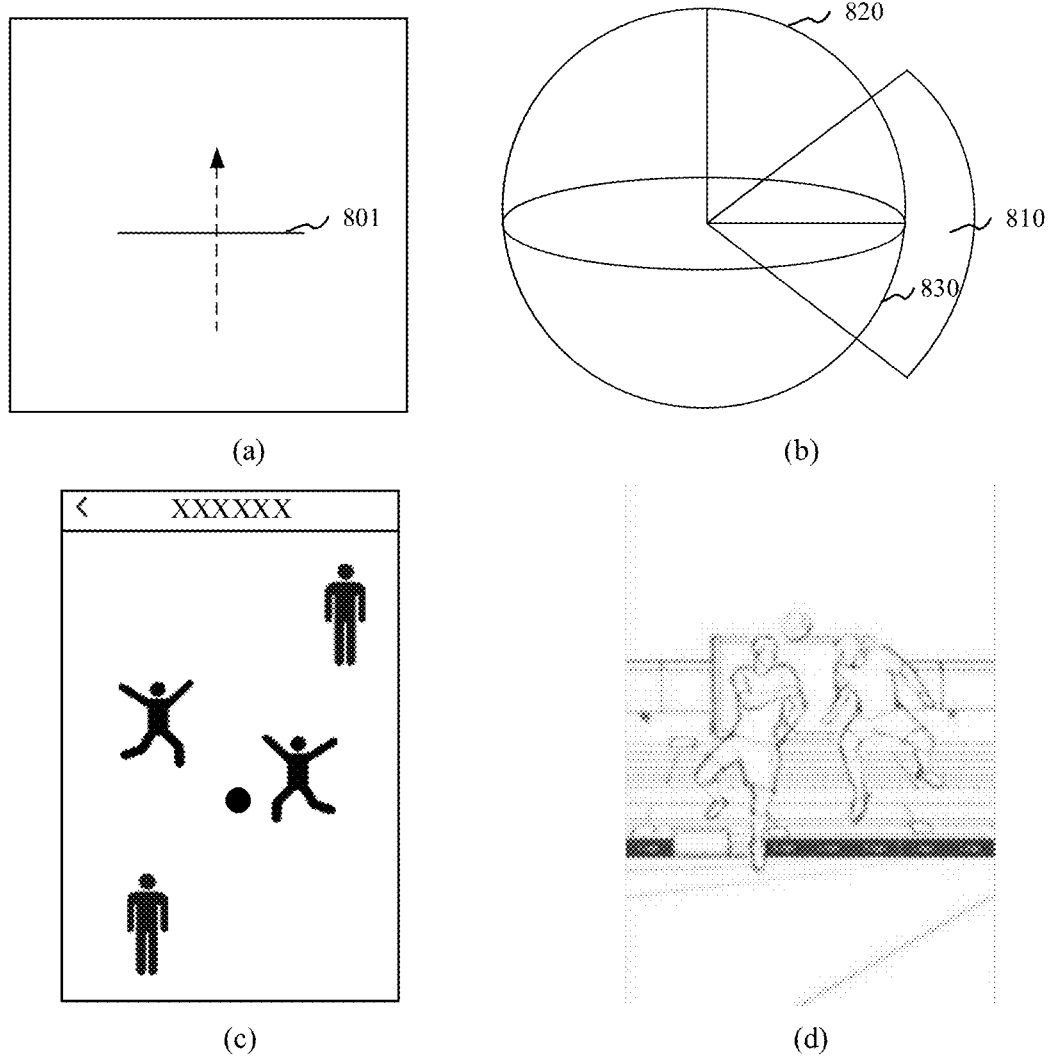
FIGS. 8 (a)-(d) are principle diagrams of rendering of a position of a current terminal after passing through a space area according to an embodiment.

FIG. 8 shows a principle diagram of rendering of a position of a current terminal after passing through a space area according to an embodiment. Referring to FIG. 8, FIG. 8(*a*) shows a schematic diagram of the position of the current terminal passing through the space area. It may be clearly seen that the position of the terminal passes through an area at which the virtual entry 801 is located and moves from one side of the virtual entry to the other side of the virtual entry. FIG. 8(*b*) shows a schematic diagram of determining a video picture in a current field of view in a three-dimensional spherical model for rendering a panoramic video. It may be clearly seen that the center of the sphere of the three-dimensional spherical model is a position of the terminal, that is, a position of a terminal camera as an observation point, and a video picture of an intersection area 830 of a current field of view 810 and a spherical surface 820 is a picture to be displayed on a terminal screen. FIG. 8(*c*) shows a simplified schematic diagram of a video picture of the intersection area 830 displayed on the terminal interface, and FIG. 8(*d*) shows a screenshot of the video picture of the intersection area 830 displayed on the terminal interface.

In an embodiment, the posture of the terminal may change according to a user instruction after the position of the current terminal passes through the space area. The current field of view of the terminal changes immediately when the posture of the terminal changes. The terminal may display the video picture in the panoramic video in the current field of view in real time.

The image processing method can further include determining, after the video picture in the current field of view in the panoramic video is directly displayed, a field of view within the virtual entry in the current field of view in a case that the position of the current terminal does not pass through the space area again and the current field of view is moved to cover the virtual entry, and displaying, in the virtual entry, a picture within the determined field of view in the obtained image frame.

It may be understood that the position of the current terminal not passing through the space area again and the current field of view being moved to cover the virtual entry is that the current terminal is not displaced to pass through the virtual entry, but the posture of the current terminal is adjusted, so that the virtual entry re-enters the current field of view of the terminal. For example, when it is detected that the position of the current terminal does not pass through the space area again, and the current field of view is moved to cover the virtual entry, the terminal determines, after directly displaying the video picture in the current field of view in the panoramic video, the field of view within the virtual entry in the current field of view, and displays, in the virtual entry, the picture within the determined field of view in the obtained image frame. In this way, the real world is displayed within the virtual entry, and virtual content is displayed outside the virtual entry.

It may be understood that after the user enters a room through a room door, the room door is behind the user and no longer appears in the field of view of the user. The user watches scene pictures everywhere in the room by adjusting the field of view in the room, that is, a directly displayed video picture in a panoramic video in a current field of view after the position of the current terminal in this embodiment passes through the space area, so that the user sees a panoramic video within the virtual entry. After the user turns around, the room door reappears in the field of view of the user, and the user sees a real picture outside the room through the room door. In other words, in this embodiment, when the position of the current terminal does not pass through the space area again and the current field of view is moved to cover the virtual entry, a field of view within the virtual entry in the current field of view is determined; and a picture within the determined field of view in the obtained image frame is displayed in the virtual entry. In this way, the user sees a picture of a real scene within the virtual entry.

Figure 9:
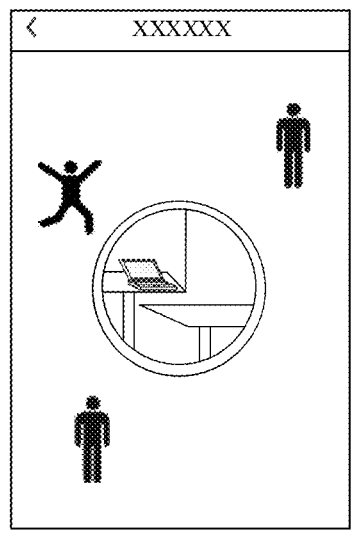
FIG. 9 is a schematic interface diagram displayed on a terminal interface when the position of the current terminal does not pass through the space area again and a current field of view is moved to cover a virtual entry according to an embodiment.

FIG. 9 shows a schematic interface diagram displayed on a terminal interface when the position of the current terminal does not pass through the space area again and the current field of view is moved to cover the virtual entry according to an embodiment. Referring to FIG. 9, a picture of the real scene is displayed inside the virtual entry, and virtual content is displayed outside the virtual entry.

In an embodiment, the image processing method can further include determining a field of view within the virtual entry in the current field of view in a case that the position of the current terminal is moved around the space area, and displaying, in the virtual entry, a video picture within the determined field of view in the panoramic video.

Figure 10:
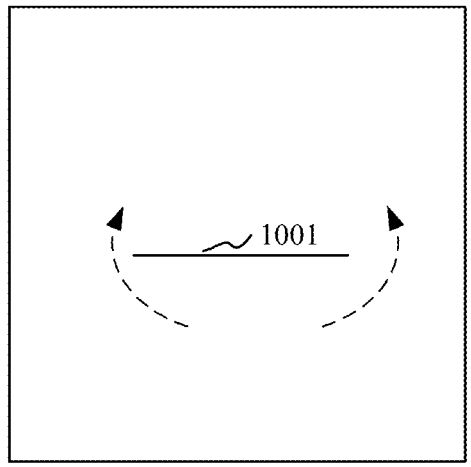
FIG. 10 is a principle diagram of rendering when the position of the current terminal is moved around a space area according to an embodiment.
Figure 10:
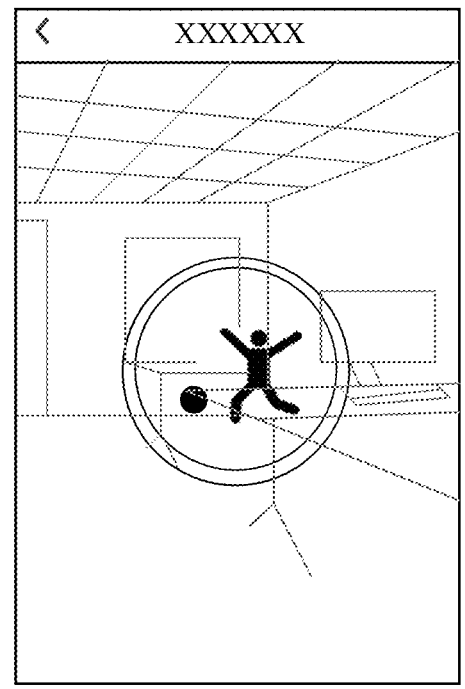

FIG. 10 shows a principle diagram of rendering when the position of the current terminal is moved around a space area according to an embodiment. Referring to FIG. 10, the left diagram of FIG. 10 shows a schematic diagram when the position of the current terminal is moved around the space area. It may be clearly seen that the position of the terminal bypasses an area in which the virtual entry 1001 is located and is moved from one side of the virtual entry to the other side of the virtual entry. When the terminal moves in a manner shown in the left diagram of FIG. 10, in a picture displayed by the terminal, virtual content is always displayed inside the virtual entry, and a picture of the real scene is always displayed outside the virtual entry, as shown in the right diagram of FIG. 10.

In an exemplary application scenario, the user holds a terminal and opens a built-in camera on the terminal by using an application program for invoking the camera on the terminal, so that the terminal may acquire image frames from a real scene in a current field of view of the camera. The user holds the terminal to draw a circle with the index fingertip of the hand in a field of view of a rear camera, so that a virtual door, that is, a virtual entry, appears at a position at which the circle is drawn by the finger in the real scene. In this case, the terminal renders the virtual entry at the position corresponding to an image position of the terminal screen. The picture of the real scene is displayed outside the virtual entry, and a local video picture of a panoramic video is displayed inside the virtual entry.

If the user holds the terminal to be close to a position of the virtual entry mapped to the real scene, the virtual entry on the terminal screen gradually becomes larger until the virtual entry no longer appears on the terminal screen after the terminal passes through the position. In this case, the user sees a local video picture of the panoramic video displayed on the terminal screen. The user may adjust the field of view of the rear camera to view panoramic video pictures of different areas.

The user may step back while holding the terminal to pass through the position again. In this case, the virtual entry appears on the terminal screen and gradually becomes smaller. The picture of the real scene is displayed outside the virtual entry, and the local video picture of the panoramic video is displayed inside the virtual entry. The user may turn around while holding the terminal, but does not pass through the position again. In this case, the virtual entry appears on the terminal screen. The local video picture of the panoramic video is displayed outside the virtual entry, and the picture of the real scene is displayed inside the virtual entry.

The user holds the terminal and moves around a position of the virtual entry mapped to the real scene. In this case, the virtual entry always appears on the terminal screen. The picture of the real scene is displayed outside the virtual entry, and the local video picture of the panoramic video is displayed inside the virtual entry.

In the foregoing embodiments, a change in rendered content inside and outside the virtual entry is provided when the position of the current terminal passes through or is moved around the virtual entry. Therefore, the user may move the position from the outside of the entry to the inside of the entry to view the virtual world inside the entry, or may move from the inside of the entry to the outside of the entry to view the real world outside, so as to experience a passing-through effect between the virtual world and the real world.

In an embodiment, the virtual content can be a panoramic video. The image processing method can further include drawing an acquired video frame on an inner side of a spherical surface of a first spherical model, and drawing a panoramic video picture of the panoramic video on an inner side of a spherical surface of a second spherical model, determining a space area that is of the virtual entry and that corresponds to the real scene, and rendering the first spherical model, the second spherical model, and a fully transparent third model in a current field of view in a rendering order and a reverse order of model depths in a case that a position of a current terminal never passes through the space area, or a quantity of times for which a position of a current terminal passes through the space area is an even number. A spherical radius of the first spherical model is greater than a spherical radius of the second spherical model, a model depth of the first spherical model is greater than a model depth of the second spherical model, a model depth of the second spherical model is greater than a model depth of the third model, and the third model is used for triggering to cancel rendering of the second spherical model in a field of view outside the virtual entry in the current field of view in a case that the current field of view covers the virtual entry, or used for triggering to cancel rendering of the second spherical model in a case that the field of view does not cover the virtual entry.

The rendering order is an order in which the models are rendered. The model depth is a distance from a model boundary to an observation point. A greater model depth indicates a farther distance from the model boundary to the observation point. The observation point is a position at which the model is observed inside the model, and a picture obtained through rendering in a field of view of the observation point is a picture displayed on the terminal screen. Generally, when the model in the field of view is rendered to obtain a picture for display, rendering is performed in a reverse order of the model depths, that is, a model closer to the observation point is rendered first. The rendering order is a manually set order on which the rendering is based.

In this embodiment, rendering is performed according to both the rendering order and the reverse order of the model depths. In this way, during rendering of a model, when the rendered model has a depth less than depths of other models, the model is no longer rendered. In an embodiment, the terminal may record depth information of the models in a depth buffer during modeling, as well as a depth information test mark to the depth buffer. The adding a depth information test mark represents that the terminal reads the model depth of the model during drawing of the model and renders the model according to the model depth.

Exemplarily, the terminal may determine a model coordinate position of the virtual entry in a model coordinate space according to a change relationship between the model coordinate space and a world coordinate space, and a world coordinate position of the virtual entry in a world coordinate system. Then, the first spherical model and the second spherical model are established by using the model coordinate position as the center of the sphere. The terminal may further draw an acquired video frame in a texture manner on the inner side of the spherical surface of the first spherical model, and draw a panoramic video picture of the panoramic video in the texture manner on the inner side of the spherical surface of the second spherical model.

In an embodiment, the terminal may further create, in front of the observation point, a model plane that may be projected onto the terminal screen. The model plane always remains in front of the observation point as the observation point moves and turns. Then, the terminal draws the image frames acquired from the real scene on the model plane, so that the obtained image frames are played one by one according to an acquisition time sequence.

It may be understood that after the trigger condition is met, when the virtual entry is rendered for the first time, virtual content is displayed inside the virtual entry, and a real scene is displayed outside the virtual entry. Therefore, when the position of the current terminal never passes through the space area, or a quantity of times for which the position of the current terminal passes through the space area is an even number, the virtual content is still displayed inside the virtual entry, and the real scene is still displayed outside the virtual entry.

In this way, in order to maintain the virtual content displayed inside the virtual entry and the real scene displayed outside the virtual entry, the terminal may create a third model surrounding the observation point and set the rendering order as: the first spherical model→the third model→the second spherical model. The virtual entry is located on an interface of the third model, and an area at which the virtual entry is located is empty.

Figure 11:
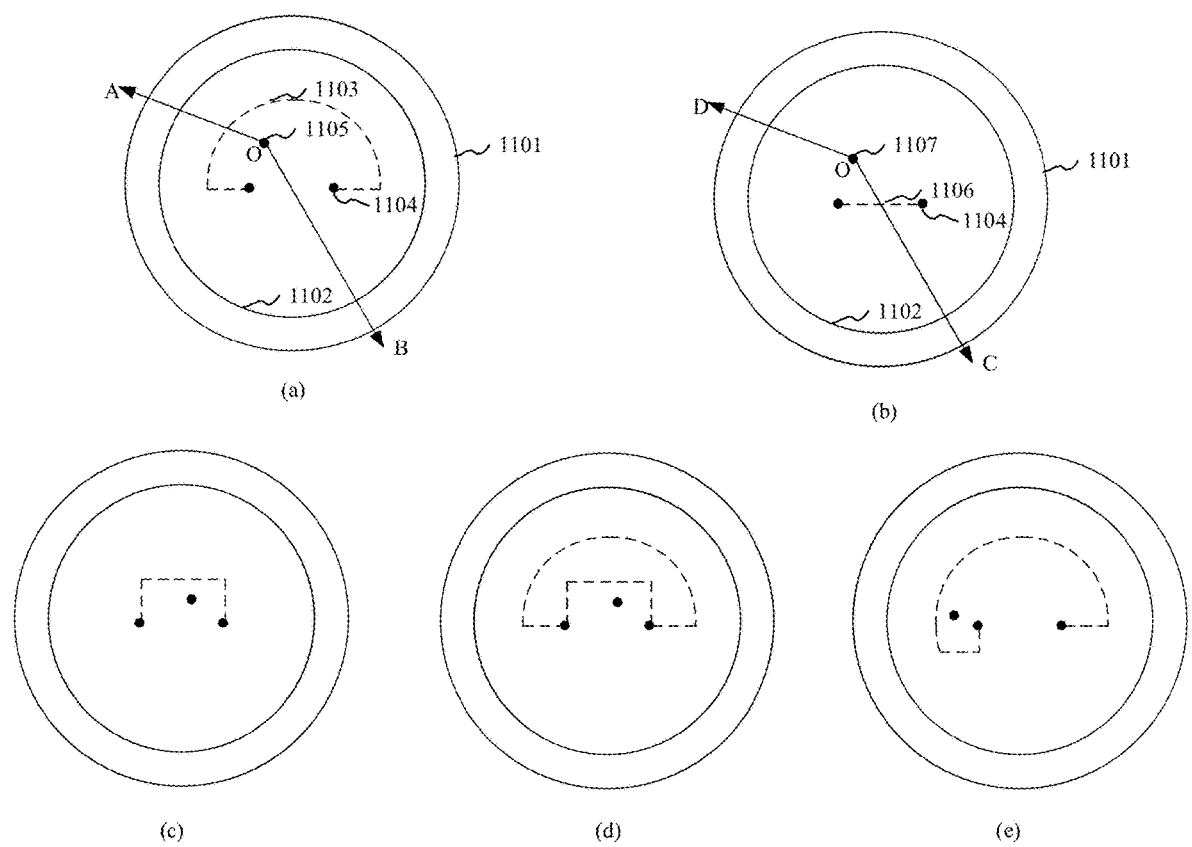
FIGS. 11(a)-(e) are schematic cross-sectional diagrams of a model according to an embodiment.

FIG. 11 shows a schematic cross-sectional diagram of a model according to an embodiment. Referring to FIG. 11(a), a first spherical model 1101, a second spherical model 1102, a third model 1103, and a virtual entry 1104 are included. In this case, an observation point 1105 is far away from the virtual entry 1104.

In this way, when the third model exists on a line of sight of a field of view of the observation point, because the third model is rendered before the second spherical model in the rendering order, and a model depth of the third model is less than a model depth of the second spherical model, the terminal only renders the first spherical model and the third model to obtain a picture for display. The terminal may further set transparency of the third model to be fully transparent. In this case, the picture for display is actually a video frame acquired from the real scene and drawn on an inner side of a spherical surface of the first spherical model. In other words, it is ensured that the real scene is displayed outside the virtual entry.

Still referring to FIG. 11(a), a line of sight OA starting from the observation point 1105 and not passing through the virtual entry 1104 successively passes through the third model, the second spherical model, and the first spherical model, as shown in FIG. 12(a). In this way, during rendering, because a rendering order is: the first spherical model→the third model→the second spherical model, it is assumed that a color of the third model is C3 and transparency thereof is T3; a color of the second spherical model is C2, and transparency thereof is T2; and a color of the first spherical model is C1, and transparency thereof is T1. Therefore, a color obtained on a screen through rendering is: $C3*T3+(1-C3)*T1*C1$. Exemplarily, C3 may be set to 0, representing being fully transparent, and C1 may be set to 1, representing being opaque. Therefore, the color on the screen is the color of the first spherical model, that is, the image frame acquired from the real scene and drawn on the inner side of the spherical surface of the first spherical model.

When the third model does exist on the line of sight of the field of view of the observation point, the terminal only renders the first spherical model and the second spherical model to obtain a picture for display. The terminal may set the second spherical model to be opaque. Therefore, the picture for display is actually a video frame for drawing a panoramic video on the inner side the spherical surface of the second spherical model. In other words, it is ensured that virtual content is displayed in the virtual entry.

Figure 12:
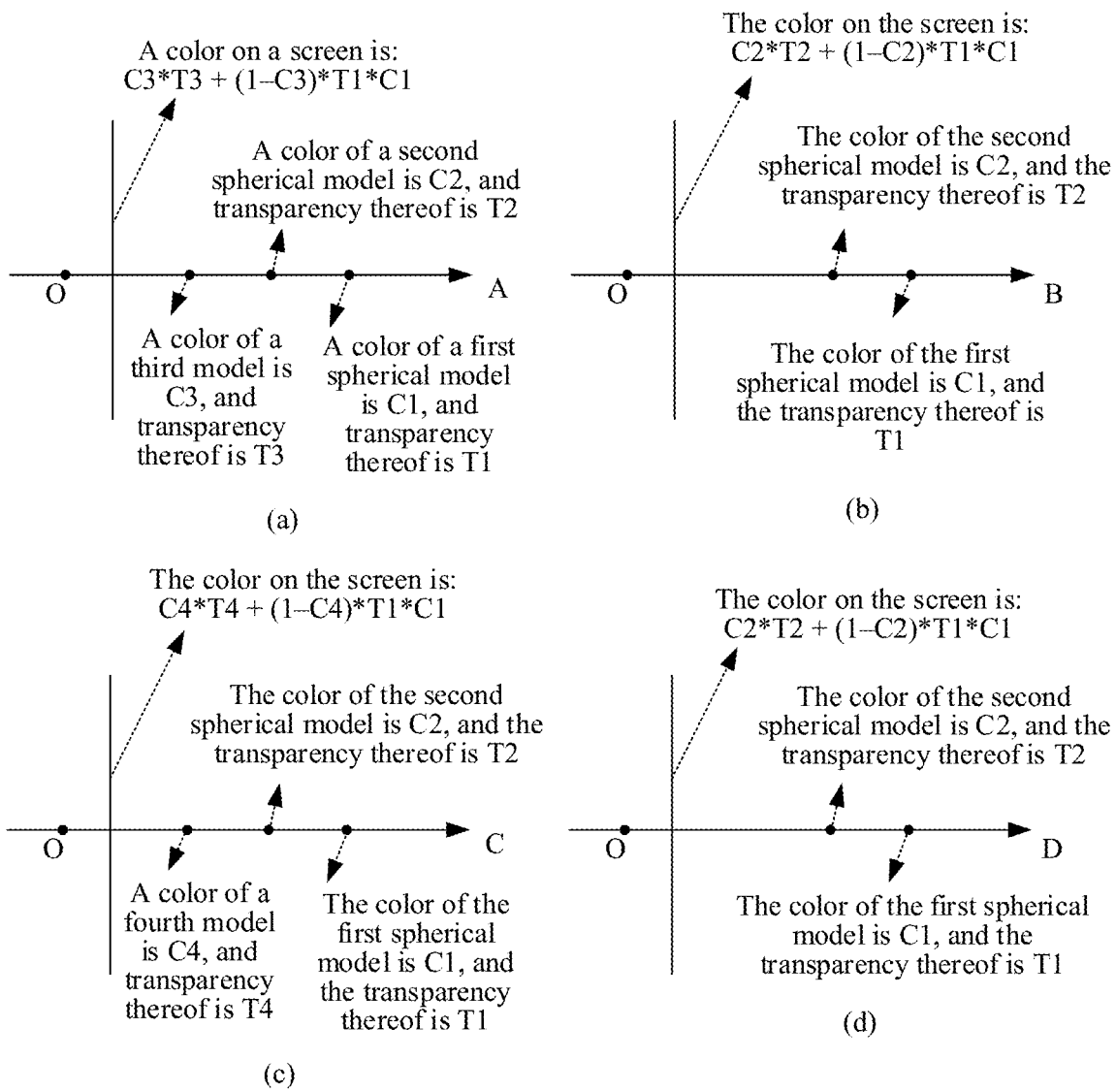
FIGS. 12 (a)-(d) are schematic principle diagrams of rendering according to an embodiment.

Still referring to FIG. 11($a$), a line of sight OB starting from the observation point 1105 and passing through the virtual entry 1104 successively passes through the second spherical model and the first spherical model, as shown in FIG. 12($b$). In this way, during rendering, because a rendering order is: the first spherical model→the second spherical model. It is assumed that a color of the second spherical model is C2 and transparency thereof is T2; and a color of the first spherical model is C1, and transparency thereof is T1. Therefore, a color obtained on a screen through rendering is: C2*T2+(1−C2)*T1*C1. Specifically, C2 may be set to 1, representing being opaque, and C1 may be set to 1, representing being opaque. Therefore, the color on the screen is the color of the second spherical model, that is, the video frame of the panoramic video drawn on the inner side of the second spherical model.

In the foregoing embodiment, when the user enters the virtual entry, the rendering of a panoramic video on the second spherical model in a field of view outside the virtual entry in the current field of view is triggered to be cancelled when the virtual entry is covered through the third model in the current field of view; and the rendering of the panoramic video on the second spherical model is triggered to be cancelled when the field of view does not cover the virtual entry. In this way, it is ensured the user sees content of the panoramic video when not seeing the virtual entry after entering the virtual entry; and when the user sees the virtual entry, content of the real scene is displayed inside the virtual entry, and content of the panoramic video is displayed outside the virtual entry.

In an embodiment, the image processing method further includes: rendering the first spherical model, the second spherical model, and a fully transparent fourth model in the current field of view according to a rendering order and a reverse order of model depths in a case that the quantity of times for which the position of the current terminal passes through the space area is an odd number, where a model depth of the second spherical model is greater than a model depth of the fourth model; and the fourth model is used for triggering to cancel rendering of the second spherical model in a field of view outside the virtual entry in the current field of view in a case that the current field of view covers the virtual entry, or used for triggering to cancel rendering of the second spherical model in a case that the field of view does not cover the virtual entry.

It may be understood that after the trigger condition is met, when the virtual entry is rendered for the first time, virtual content is displayed inside the virtual entry, and a real scene is displayed outside the virtual entry. Therefore, when the quantity of times for which the position of the current terminal passes through the space area is an odd number, content inside the virtual entry is changed into the real scene, and content outside the virtual entry is changed into the virtual content scene.

In this way, in order to maintain that the content inside the virtual entry being changed into the real scene and the content outside the virtual entry being changed into the virtual content scene, the terminal may create a fourth model surrounding the observation point, and set the rendering order to: the first spherical model→the fourth model→the second spherical model. An interface of the fourth model is the virtual entry.

Referring to FIG. 11($b$), a first spherical model 1101, a second spherical model 1102, a fourth model 1106, and a virtual entry 1104 are included. In this case, an observation point 1107 is far away from the virtual entry 1104.

In this way, when the fourth model exists on a line of sight of a field of view of the observation point, because the fourth model is rendered before the second spherical model in the rendering order, and a model depth of the fourth model is less than a model depth of the second spherical model, the terminal only renders the first spherical model and the fourth model to obtain a picture for display. The terminal may further set transparency of the fourth model to be fully transparent. In this case, the picture for display is actually a video frame acquired from the real scene and drawn on an inner side of a spherical surface of the first spherical model. In other words, it is ensured that the real scene is displayed inside the virtual entry.

Still referring to FIG. 11($b$), a line of sight OC starting from the observation point 1107 and passing through the virtual entry 1104 successively passes through the fourth model, the second spherical model, and the first spherical model, as shown in FIG. 12($c$). In this way, during rendering, because a rendering order is: the first spherical model→the fourth model→the second spherical model, it is assumed that a color of the fourth model is C4 and transparency thereof is T4; a color of the second spherical model is C2, and transparency thereof is T2; and a color of the first spherical model is C1, and transparency thereof is T1. Therefore, a color obtained on a screen through rendering is: C4*T4+(1−C4)*T1*C1. In particular, C4 may be set to 0, representing being fully transparent, and C1 may be set to 1, representing being opaque, and then the color on the screen is the color of the first spherical model, that is, the image frame acquired from the real scene and drawn on the inner side of the spherical surface of the first spherical model.

When there is no third model on the line of sight of the field of view of the observation point, the terminal only renders the first spherical model and the second spherical model to obtain a picture for display. The terminal may set the second spherical model to be opaque. Then, in this case, the picture for display is actually a video frame for drawing a panoramic video on the inner side the spherical surface of the second spherical model. That is to say, it is ensured that virtual content is displayed outside the virtual entry.

Still referring to FIG. 11($a$), a line of sight OB starting from an observation point 1107 and passing through the virtual entry 1104 successively passes through the second spherical model and the first spherical model, as shown in FIG. 12($d$). In this way, during rendering, because a rendering order is: the first spherical model→the second spherical model, it is assumed that the color of the second spherical model is C2 and transparency thereof is T2; a color of the first spherical model is C1, and transparency thereof is T1; a color obtained on a screen through rendering is: C2*T2+(1−C2)*T1*C1. Specifically, C2 may be set to 1, representing being opaque, and C1 may be set to 1, representing being opaque. Therefore, the color on the screen is the color of the second spherical model, that is, the video frame of the panoramic video drawn on the inner side of the second spherical model.

In the foregoing embodiment, when the user does not enter the virtual entry, the rendering of a panoramic video on the second spherical model in a field of view outside the virtual entry in the current field of view is triggered to be cancelled when the virtual entry is covered through the fourth model in the current field of view; and the rendering of the panoramic video content on the second spherical model is triggered to be cancelled when the field of view does not cover the virtual entry. In this way, it is ensured the user sees content of the real scene when not seeing the virtual entry after not entering the virtual entry; and when the user sees the virtual entry, content of the panoramic video is displayed inside the virtual entry, and content of a display scene is displayed outside the virtual entry.

In another embodiment, when the observation point is closer to the virtual entry, a boundary area of the third model or the fourth model may be added at a position at which the observation point is located, to avoid disturbance during rendering when the observation point passes through or moves around the virtual entry. FIG. 12(c) is a cross-sectional view of a model when a quantity of times for which the position of the current terminal passes through the space area is an odd number and the current terminal faces and is close to the virtual entry. FIG. 12(d) is a cross-sectional view of a model when a quantity of times for which the position of the current terminal does not pass through the space area or the position of the current terminal passes through the space area is an even number, and the current terminal faces and is close to the virtual entry. FIG. 12(e) is a cross-sectional view of a model when the quantity of times for which the position of the current terminal does not pass through the space area or the position of the current terminal passes through the space area is an even number and the current terminal detours on one side of the virtual entry.

In an embodiment, when the quantity of times for which the position of the current terminal does not pass through the space area or the position of the current terminal passes through the space area is an even number and the current terminal detours from one side of the virtual entry to the other side of the virtual entry, the third model is flipped on a plane on which the virtual entry is located. In this way, it is ensured that the virtual content is still displayed in the virtual entry and the image frame acquired from the real world is still displayed outside the virtual entry. In other words, only after the terminal passes through the virtual entry, the content displayed inside and outside the virtual entry is exchanged.

It may be understood that the terminal renders a three-dimensional spherical space in the camera. A texture image of a panoramic video is attached and played in the spherical space, the image frame acquired from the real scene is played on a spherical surface with a spherical diameter greater than the sphere or on a model plane in front of the observation point. The terminal then simulates an anywhere door when the trigger condition is met, to display the virtual world inside the door and display an image of the real world outside the door. The user may move a position from the outside of the door to a door opening to view the virtual world inside the door, or move from the inside of the door to the outside of the door to view the real world outside, so as to experience a passing-through effect between the virtual world and the real world.

When a person enters the anywhere door and is far away from the door, the door is used as a fourth model that is completely transparent. In this way, when a person looks through the door, the real world is displayed inside the door, and the virtual world is displayed outside the door, that is, the person is in the virtual world. When the person enters the anywhere door and is extremely close to the door, in order to prevent the person from passing through the door and causing rendering jitter, a small room just fitting the door is temporarily placed opposite to the door, the door itself is empty and the small room is completely transparent. When the person looks through the door, the real world is displayed inside the door, and the virtual world is displayed outside the door, that is, the person is in the virtual world.

When the person does not enter the anywhere door and is far away from the door, a third model surrounding the observation point is created by using the door as a local boundary. An area at which the door is located on the third model is empty, and the other area is fully transparent. In this way, when the person looks through the door, the virtual world is displayed inside the door, and the real world is displayed outside the door, that is, the person is in the real world. When the person does not enter the anywhere door and is close to the door, in order to prevent the person from passing through the door and causing rendering jitter, the door is used as a boundary and the boundary is extended on the third model. In this way, when the person looks through the door, the virtual world is displayed inside the door, and the real world is displayed outside the door, that is, the person is in the real world. When the person does not enter the anywhere door and is close to one side of the door, in order to prevent the person from passing through the door and causing rendering jitter, a boundary of one side at which the observation point is located in the third model is extended. When the person passes through a plane on which the door is located, the third model is flipped on a plane on which the door is located. In this way, when the person looks out through the door, the virtual world is still displayed inside the door, and the real world is still displayed outside the door, that is, the person is in the real world.

It may be understood, in the foregoing embodiment, the third model and the boundary of the third model may be a plane or a curved surface.

Figure 13:
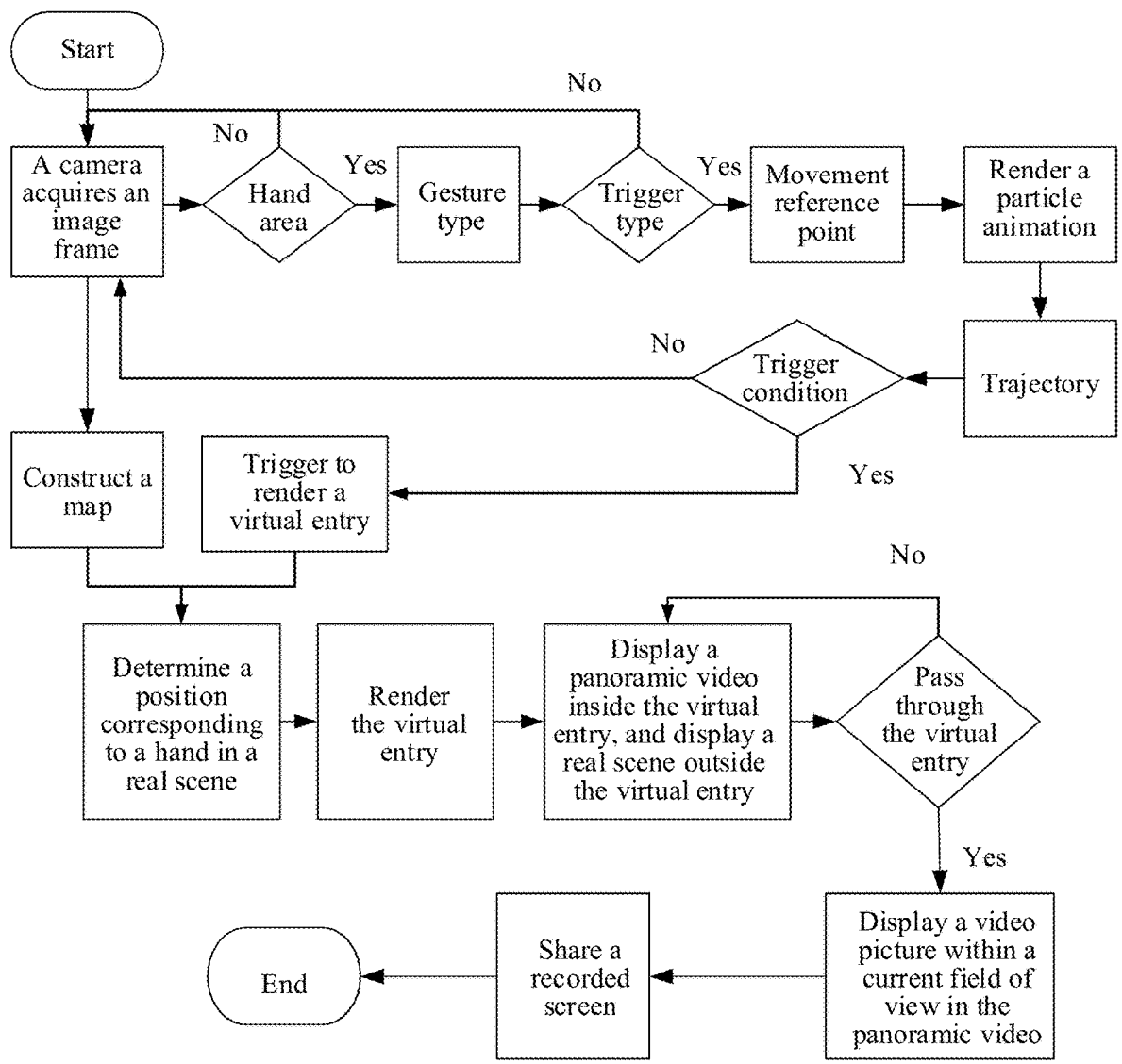
FIG. 13 is a flowchart of an image processing method according to an embodiment.

FIG. 13 is a flowchart of an image processing method according to an exemplary embodiment. Referring to FIG. 13, a user holds a terminal and acquires an image frame from a real scene through a camera of the terminal. The terminal constructs a map according to the acquired image frame, and detects whether the image frame includes a hand area. If the terminal does not detect that the image frame includes the hand area, the terminal continues to detect a subsequently acquired image frame. If the terminal detects that the image frame includes the hand area, the terminal continues to determine whether a gesture type corresponding to the hand area is a trigger type. If the gesture type is not the trigger type, the terminal continues to detect a subsequently acquired image frame. If the gesture type is the trigger type, the terminal recognizes a movement reference point of the hand area in the image frame and renders a particle animation at the movement reference point to highlight a trajectory formed by a movement of the hand. The terminal may continue to determine whether the trajectory meets a trigger condition. If the trajectory does not meet the trigger condition, the terminal continues to detect a subsequently acquired image frame. If the trajectory meets the trigger condition, the terminal triggers to render a virtual entry.

The terminal then determines a position corresponding to the hand in the real scene, renders the virtual entry in the currently played image frame according to the position, displays a panoramic video in the virtual entry, and displays the real scene outside the virtual entry. The user may hold the terminal to move, and the terminal then determines whether to pass through the virtual entry. If the terminal determines to pass through the virtual entry, a video picture in a current field of view in the panoramic video is directly displayed. If the terminal determines to not pass through the virtual entry, the panoramic video is still displayed in the virtual entry, and the real scene is displayed outside the virtual entry. The terminal may further perform screen recording according to a user instruction, and share a video obtained through the screen recording.

In an embodiment, the terminal may further display guidance information. The guidance information may be a text, a voice, or a picture. The guidance information includes information that meets the trigger condition and that is formed by guiding the user to control the movement of the target object. For example, "reaching out a finger to draw a circle in front of a rear camera so as to trigger opening of the anywhere door", referring to FIG. 3(b). The guidance information may further include information that guides the user to move toward the virtual entry. For example, an arrow pointing to the virtual entry, referring to FIG. 4(b).

It is to be understood that although the steps in the flowcharts of the foregoing embodiments are displayed in order according to arrows, the steps are not necessarily performed in the order indicated by the arrows. Unless clearly stated herein, the steps are not performed strictly in the order, and the steps may be performed in other orders. Moreover, at least a part of the steps in the foregoing embodiments may include a plurality of sub-steps or a plurality of stages. The sub-steps or stages are not necessarily performed at the same time, but may be performed at different moments. The sub-steps or stages are not necessarily performed successively in order, but may be performed in turn or alternately with at least a part of other steps or sub-steps or stages of other steps.

Figure 14:
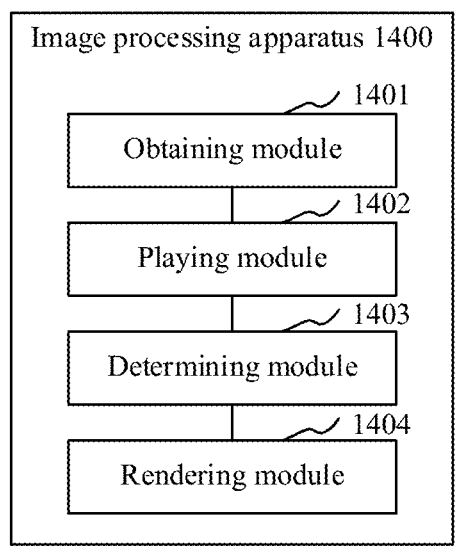
FIG. 14 is a module structure diagram of an image processing apparatus according to an embodiment.

As shown in FIG. 14, in an embodiment, an image processing apparatus 1400 is provided. Referring to FIG. 14, the image processing apparatus 1400 includes an obtaining module 1401, a playing module 1402, a determining module 1403, and a rendering module 1404. One or more of the modules included in the image processing apparatus 1400 can be implemented by processing circuitry.

The obtaining module 1401 is configured to obtain image frames acquired from a real scene.

The playing module 1402 is configured to play the obtained image frames one by one according to an acquisition time sequence.

The determining module 1403 is configured to determine a position corresponding to a target object in the real scene in a case that a trajectory formed by a movement of the target object in a plurality of the obtained image frames meets a trigger condition.

The rendering module 1404 is configured to render a virtual entry in a currently played image frame according to the position, and display virtual content in the virtual entry.

In an embodiment, the target object is a hand. The determining module 1403 is further configured to segment a hand image from the obtained image frame; recognizing a gesture type corresponding to the hand image; determining a movement reference point in the image frame when the gesture type is a trigger type; and determine, according to the movement reference point, a trajectory formed by a movement of the hand.

In an embodiment, the determining module 1403 is further configured to encode the obtained image frame into a semantic segmentation feature matrix through a hand recognition model, decode the semantic segmentation feature matrix to obtain a semantically segmented image, a pixel point in the semantically segmented image having a pixel value that represents a classification category to which the pixel point belongs and corresponding to a pixel point in the encoded image frame, and segment a hand image from an image according to a pixel point belonging to a hand category.

In an embodiment, the rendering module 1404 is further configured to replace, in a played video frame, pixel values of pixel points through which the trajectory passes with reference pixel values when the trigger condition is not met; and play a reference animation in the currently played image frame according to the position when the trigger condition is met.

In an embodiment, the determining module 1403 is further configured to determine a world coordinate position of the target object in a world coordinate space. The rendering module 1404 is further configured to render the virtual entry in the currently played image frame according to a camera coordinate position corresponding to the world coordinate position in a camera coordinate space.

In an embodiment, the rendering module 1404 is further configured to obtain a position and a posture of a current terminal, determine a transformation matrix between the current camera coordinate space and the world coordinate space according to the position and the posture of the current terminal, transform the world coordinate position into the camera coordinate position in the camera coordinate space according to the transformation matrix, and render the virtual entry in the currently played image frame according to the camera coordinate position.

In an embodiment, the rendering module 1404 is further configured to select a map node matching the obtained image frame from a map; query for a stored position that is in the real scene and that corresponds to the map node; obtain sensor data acquired by an inertial sensor; and determine the gesture of the current terminal in the real scene according to the sensor data.

Figure 15:
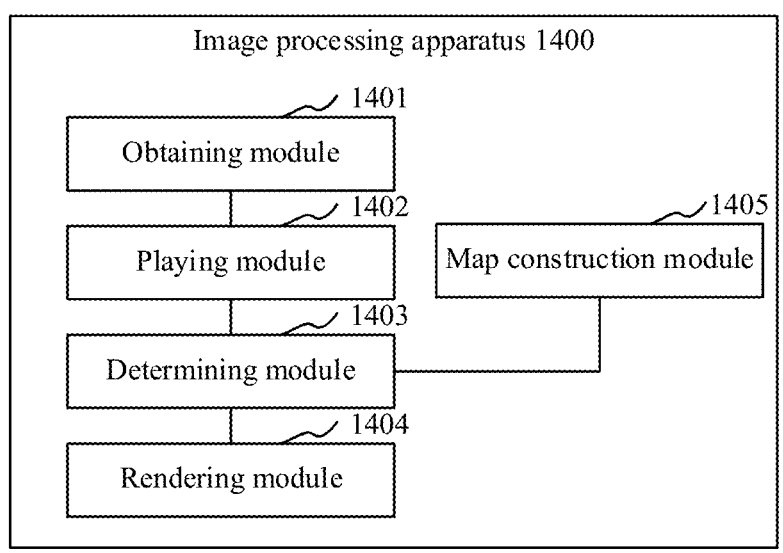
FIG. 15 is a module structure diagram of an image processing apparatus according to another embodiment.

As shown in FIG. 15, in an embodiment, the image processing apparatus 1400 further includes a map construction module 1405, configured to select an image frame from the image frames acquired according to the time sequence; obtain the selected image frame as a node image in a case that an image feature of the selected image frame conforms to an image feature of the node image; determine a corresponding map node of the obtained node image in the map; and store the image feature of the obtained node image corresponding to the determined map node and a position at which the obtained node image is acquired in the real scene.

In an embodiment, the rendering module 1404 is further configured to project model vertexes of the virtual entry into corresponding pixel points in an image coordinate space; combine the corresponding pixel points of the model vertexes into image elements according to a connection relationship between the model vertexes; and render rasterized image elements according to pixel values of the pixel points in the image elements at an image coordinate position corresponding to the camera coordinate position in the image coordinate space, to obtain the virtual entry.

In an embodiment, virtual content is a panoramic video. The rendering module 1404 is further configured to determine a space area that is of the virtual entry and that corresponds to the real scene; and directly display a video picture in a current field of view in the panoramic video after a position of a current terminal passes through the space area.

In an embodiment, the rendering module 1404 is further configured to determine, after the video picture in the current field of view in the panoramic video is directly displayed, a field of view within the virtual entry in the current field of view in a case that the position of the current terminal does not pass through the space area again and the current field of view is moved to cover the virtual entry; and display, in the virtual entry, a picture within the determined field of view in the obtained image frame.

In an embodiment, the rendering module 1404 is further configured to determine a field of view within the virtual entry in the current field of view in a case that the position of the current terminal is moved around the space area; and display, in the virtual entry, a video picture within the determined field of view in the panoramic video.

In an embodiment, virtual content is a panoramic video. The rendering module 1404 is further configured to draw an acquired video frame on an inner side of a spherical surface of a first spherical model, and draw a panoramic video picture of the panoramic video on an inner side of a spherical surface of a second spherical model, determine a space area that is of the virtual entry and that corresponds to the real scene, and render the first spherical model, the second spherical model, and a fully transparent third model in a current field of view in a rendering order and a reverse order of model depths in a case that a position of a current terminal never passes through the space area, or a quantity of times for which a position of a current terminal passes through the space area is an even number. A spherical radius of the first spherical model is greater than a spherical radius of the second spherical model, a model depth of the first spherical model is greater than a model depth of the second spherical model, a model depth of the second spherical model is greater than a model depth of the third model, and the third model is used for triggering to cancel rendering of the second spherical model in a field of view outside the virtual entry in the current field of view in a case that the current field of view covers the virtual entry, or used for triggering to cancel rendering of the second spherical model in a case that the field of view does not cover the virtual entry.

In an embodiment, the rendering module 1404 is further configured to render the first spherical model, the second spherical model, and a fully transparent fourth model in the current field of view according to a rendering order and a reverse order of model depths in a case that the quantity of times for which the position of the current terminal passes through the space area is an odd number, where a model depth of the second spherical model is greater than a model depth of the fourth model; and the fourth model is used for triggering to cancel rendering of the second spherical model in a field of view outside the virtual entry in the current field of view in a case that the current field of view covers the virtual entry, or used for triggering to cancel rendering of the second spherical model in a case that the field of view does not cover the virtual entry.

Figure 16:
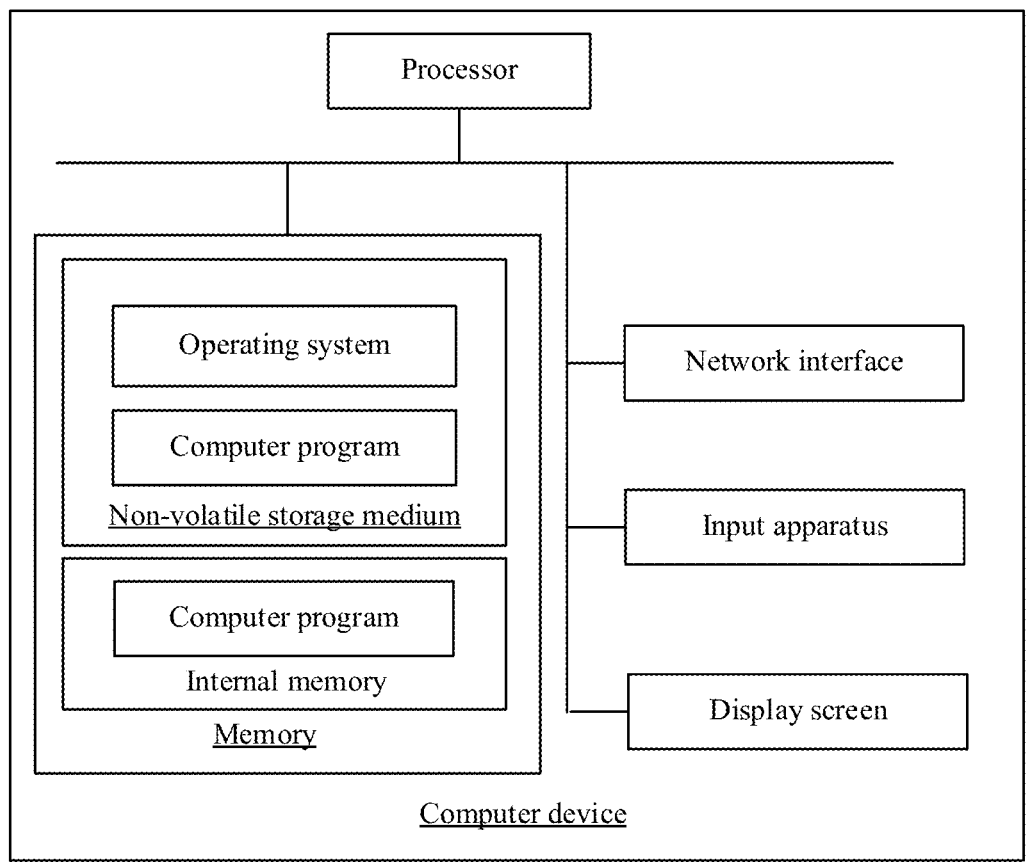
FIG. 16 is an internal structure diagram of a computer device according to an embodiment.

FIG. 16 shows an internal structure diagram of a computer device according to an embodiment. The computer device may be the terminal 110 in FIG. 1. As shown in FIG. 16, the computer device includes processing circuitry, such as a processor, a memory, a network interface, an input apparatus, and a display screen that are connected through a system bus. The memory includes a non-volatile storage medium and an internal memory. The non-volatile storage medium of the computer device stores an operating system and may further store a computer program, the computer program, when executed by the processor, causing the processor to implement the image processing method. The internal memory may also store a computer program, the computer program, when executed by the processor, causing the processor to perform the image processing method. The display screen of the computer device may be a liquid crystal display screen or an electronic ink display screen. The input apparatus may be a touch layer covering the display screen, or may be a key, a trackball, or a touch pad disposed on a housing of the computer device, or an external keyboard, touch pad, or mouse. It may be understood by a person skilled in the art that the structure shown in FIG. 16 is only a block diagram of a part of the structure related to the solution of this application, and does not constitute a limitation on the computer device to which the solution of this application is applied. The computer device may specifically include more or fewer components than those shown in the figure, or be combined with some components, or have a different component arrangement.

In an embodiment, the image processing apparatus provided in this application may be implemented in a form of a computer program. The computer program may be run on the computer device shown in FIG. 16. The non-volatile storage medium of the computer device may store program modules included in the image processing apparatus, such as the obtaining module 1401, the playing module 1402, the determining module 1403, and the rendering module 1404 shown in FIG. 14. The computer program formed by the program modules causes the processor to perform the operations in the image processing method of the embodiments of this application described in the specification.

For example, the computer device shown in FIG. 16 may obtain image frames acquired from a real scene through the obtaining module 1401 in the image processing apparatus 1400 shown in FIG. 14, play the obtained image frames one by one according to an acquisition time sequence through the playing module 1402, determine a position corresponding to a target object in the real scene through the determining module 1403 when a trajectory formed by a movement of the target object in a plurality of the obtained image frames meets a trigger condition, and render a virtual entry in a currently played image frame according to the position through the rendering module 1404, and display virtual content in the virtual entry.

In an embodiment, a computer-readable storage medium is provided, the computer-readable storage medium storing a computer program, the computer program, when executed by a processor, causing the processor to perform any one of the foregoing image processing methods.

In an embodiment, a computer device is provided, including a memory (e.g., a non-transitory memory computer-related medium) and a processor, the memory storing a computer program, the computer program, when executed by the processor, causing the processor to perform any one of the foregoing image processing methods.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing method embodiments are performed. Any reference to a memory, a storage, a database, or another medium used in the various embodiments provided in this application can include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus direct RAM (RDRAM), a direct Rambus dynamic RAM (DRDRAM), and a Rambus dynamic RAM (RDRAM).

The technical features in the foregoing embodiments may be combined in vary combinations. For concise description, not all possible combinations of the technical features in the embodiment are described. However, the combinations of the technical features shall all be considered as falling within the scope recorded in this specification provided that they do not conflict with each other.

The foregoing embodiments only show several implementations of this application and are described in detail, but they are not to be construed as a limit to the patent scope of this application. A person of ordinary skill in the art may further make variations and improvements without departing from the ideas of this application, which shall fall within the protection scope of this application. Therefore, the protection scope of the patent of this application shall be subject to the appended claims.

What is claimed is:

1. An image processing method that is applied to a computer device, the method comprising:
   obtaining, by processing circuitry of the computer device, a plurality of image frames acquired from a real scene;
   playing the obtained image frames one by one according to an acquisition time sequence;
   determining a position corresponding to a target object in the real scene, in response to determining that a trajectory formed by a movement of the target object in the plurality of the obtained image frames satisfies a trigger condition;
   rendering a virtual entry in a currently ayed image frame according to the determined position; and
   displaying virtual content in the virtual entry,
   wherein the virtual content is a panoramic video and the method further comprises
      drawing an acquired video frame on an inner side of a spherical surface of a first spherical model and drawing a panoramic video picture of the panoramic video on an inner side of a spherical surface of a second spherical model, and
      rendering the first spherical model, the second spherical model, and a fully transparent third model in a current field of view according to a rendering order and a reverse order of model depths.

2. The method according to claim 1, wherein the target object is a hand and the method further comprises:
   segmenting a hand image from the obtained plurality of image frames;
   recognizing a gesture type corresponding to the hand image;
   determining a movement reference point in each of the image frames when the gesture type is a trigger type; and
   determining the trajectory, which is formed by a movement of the hand, based on the movement reference points in the plurality of image frames.

3. The method according to claim 2, wherein the step of segmenting the hand image from the obtained image frames further comprises:
   encoding, for each obtained image frame of the plurality of frames, the obtained image frame into a semantic segmentation feature matrix through a hand recognition model;
   decoding, for each semantic segmentation feature matrix, the semantic segmentation feature matrix to obtain a semantically segmented image, a pixel point in the semantically segmented image having a pixel value that represents a classification category to which the pixel point belongs and corresponds to a pixel point in the obtained, image frame corresponding to the semantic segmentation feature matrix; and
   segmenting the hand image from the semantically segmented images according to a pixel point belonging to a hand category.

4. The method according to claim 2, further comprising:
   replacing, in the currently played video frame, pixel values of pixel points through which the trajectory passes with reference pixel values, when the trigger condition is not satisfied; and
   playing a reference animation in the currently played image frame according to the determined position when the trigger condition is met.

5. The method according to claim 1, wherein:
   the step of determining the position corresponding to the target object in the real scene further includes determining a world coordinate position of the target object in a world coordinate space, and
   the step of rendering the virtual entry in the currently played image frame according to the determined position further includes rendering the virtual entry in the currently played image frame according to a camera coordinate position corresponding to the world coordinate position in a camera coordinate space.

6. The method according to claim 5, wherein the step of rendering the virtual entry in the currently played image frame according to the camera coordinate position corresponding to the world coordinate position in the camera coordinate space further comprises:
   obtaining a position and a posture of a current terminal;
   determining a transformation matrix between the camera coordinate space and the world coordinate space according to the obtained position and the posture of the current terminal;
   transforming the world coordinate position into the camera coordinate position in the camera coordinate space according to the determined transformation matrix; and
   rendering the virtual entry in the currently played image frame according to the camera coordinate position.

7. The method according to claim 6, wherein the step of obtaining the position and the posture of the current terminal further comprises:
   selecting a map node matching the obtained image frame from a map;
   querying for a stored position that is in the real scene and that corresponds to the map node;
   obtaining sensor data acquired by an inertial sensor; and
   determining a gesture in the real scene according to the sensor data.

8. The method according to claim 7, further comprising:
selecting an image frame from the plurality of image frames acquired according to the acquisition time sequence;
obtaining the selected image frame as a new node image, when an image feature of the selected image frame conforms to an image feature of an existing node image;
determining a corresponding map node of the obtained new node image in the map; and
storing the image feature of the obtained new node image corresponding to the determined map node and a position at which the obtained new node image is acquired in the real scene.

9. The method according to claim 6, wherein the step of rendering the virtual entry in the currently played image frame according to the camera coordinate position further comprises:
projecting model vertexes of the virtual entry into corresponding pixel points in an image coordinate space;
combining the corresponding pixel points of the model vertexes into image elements according to a connection relationship between the model vertexes; and
rendering rasterized image elements according to pixel values of the pixel points in the image elements at an image coordinate position corresponding to the camera coordinate position in the image coordinate space in order to obtain the virtual entry.

10. The method according to claim 1, wherein the virtual content is a panoramic video and the method further comprises:
determining a space area that is of the virtual entry and that corresponds to the real scene; and
directly displaying a video picture in a current field of view in the panoramic video after a position of a current terminal passes through the space area.

11. The method according to claim 10, further comprising:
determining, after the video picture in the current field of view in the panoramic video is directly displayed, a new field of view within the virtual entry, when the position of the current terminal does not pass through the space area again and the current field of view is moved to cover the virtual entry; and
displaying, in the virtual entry, a picture within the determined new field of view in the obtained image frame.

12. The method according to claim 10, further comprising:
determining a new field of view within the virtual entry, when the position of the current terminal is moved around the space area; and
displaying, in the virtual entry, a new video picture within the new determined field of view in the panoramic video.

13. The method according to claim 1, wherein the method further comprises:
determining a space area that is of the virtual entry and that corresponds to the real scene; and
wherein:
a spherical radius of the first spherical model is greater than a spherical radius of the second spherical model,
a model depth of the first spherical model is greater than a model depth of the second spherical model,
the model depth of the second spherical model is greater than a model depth of the fully transparent third model, and
the third model triggers cancellation of rendering of the second spherical model in a new field of view outside the virtual entry when the current field of view covers the virtual entry or triggers cancellation of rendering of the second spherical model when the new field of view does not cover the virtual entry.

14. The method according to claim 13, further comprising:
rendering the first spherical model, the second spherical model, and a fully transparent fourth model in the current field of view according to a rendering order and the reverse order of model depths when the quantity of times for which the position of the current terminal passes through the space area is an odd number,
wherein:
the model depth of the second spherical model s greater than a model depth of the fourth model, and
the fourth model is used for triggering to cancel rendering of the second spherical model in the new field of view outside the virtual entry, when the current field of view covers the virtual entry, or used for triggering to cancel rendering of the second spherical model when the new field of view does not cover the virtual entry.

15. A non-transitory computer-readable storage medium storing instructions which when executed by at least one processor cause the at least one processor to perform the image processing method according to claim 1.

16. A computer device comprising a memory and a processor, the memory storing a computer program which when executed by the processor causes the processor to perform the image processing method according to claim 1.

17. The computer device according to claim 16, wherein the target object is a hand and the method further comprises:
segmenting a hand image from the obtained plurality of image frames;
recognizing a gesture type corresponding to the hand image;
determining a movement reference point in each of the image frames when the gesture type is a trigger type; and
determining the trajectory, which is formed by a movement of the hand, based on the movement reference points in the plurality of image frames.

18. The computer device according to claim 17, wherein the segmenting the hand image from the obtained image frames further comprises:
encoding, for each obtained image frame of the plurality of frames, the obtained image frame into a semantic segmentation feature matrix through a hand recognition model;
decoding, for each semantic segmentation feature matrix, the semantic segmentation feature matrix to obtain a semantically segmented image, a pixel point in the semantically segmented image having a pixel value that represents a classification category to which the pixel point belongs and corresponds to a pixel point in the obtained image frame corresponding to the semantic segmentation feature matrix; and
segmenting the hand image from the semantically segmented images according to a pixel point belonging to a hand category.

19. The computer device according to claim 17, further comprising:

replacing, in the currently played video frame, pixel values of pixel points through which the trajectory passes with reference pixel values, when the trigger condition is not satisfied; and playing a reference animation in the currently played image frame according to the determined position, when the trigger condition is met.

20. An image processing apparatus, comprising:
processing circuitry configured to:
  obtain a plurality of image frames acquired from a real scene;
  play the obtained image frames one by one according to an acquisition time sequence;
  determine a position corresponding to a target object in the real scene, in response to determining that a trajectory formed by a movement of the target object in the plurality of the obtained image frames meets a trigger condition; and
  render a virtual entry in a currently played image frame according to the determined position and display virtual content in the virtual entry,
wherein the virtual content is a panoramic video and the processing circuitry is further configured to
  draw an acquired video frame on an inner side of a spherical surface of a first spherical model and draw a panoramic video picture of the panoramic video on an inner side of a spherical surface of a second spherical model, and
  render the first spherical model, the second spherical model, and a fully transparent third model in a current field of view according to a rendering order and a reverse order of model depths.

* * * * *